(12) United States Patent
Ivans

(10) Patent No.: US 10,640,215 B2
(45) Date of Patent: *May 5, 2020

(54) MODULAR REFUELING SYSTEMS FOR AIRCRAFT

(71) Applicant: Textron Innovations Inc., Providence, RI (US)

(72) Inventor: Steven Ray Ivans, Ponder, TX (US)

(73) Assignee: Textron Innovations Inc., Providence, RI (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/919,459

(22) Filed: Mar. 13, 2018

(65) Prior Publication Data

US 2019/0055021 A1 Feb. 21, 2019

Related U.S. Application Data

(63) Continuation-in-part of application No. 15/270,053, filed on Sep. 20, 2016, now Pat. No. 10,259,560.

(51) Int. Cl.
| | |
|---|---|
| *B64D 39/00* | (2006.01) |
| *B64D 9/00* | (2006.01) |
| *B64D 39/02* | (2006.01) |
| *B64D 39/06* | (2006.01) |
| B64C 39/02 | (2006.01) |
| B64D 7/06 | (2006.01) |

(52) U.S. Cl.
CPC ............. *B64D 9/003* (2013.01); *B64D 39/02* (2013.01); *B64D 39/06* (2013.01); B64C 39/024 (2013.01); B64C 2201/063 (2013.01); B64C 2201/128 (2013.01); B64D 7/06 (2013.01)

(58) Field of Classification Search
CPC ............... B64C 1/22; B64C 2201/121; B64C 2201/128; B64C 7/00; B64D 1/10; B64D 1/04; B64D 1/06; B64D 1/08; B64D 39/00

See application file for complete search history.

(56) References Cited

U.S. PATENT DOCUMENTS

| | | |
|---|---|---|
| 3,640,492 A | 2/1972 | Star |
| 3,947,080 A | 3/1976 | Ege |
| 4,697,764 A | 10/1987 | Hardy et al. |

(Continued)

OTHER PUBLICATIONS

European Exam Report; Application No. 17192070.5; EPO; dated Jan. 12, 2018.

(Continued)

*Primary Examiner* — Philip J Bonzell
*Assistant Examiner* — Tye William Abell
(74) *Attorney, Agent, or Firm* — Lawrence Youst PLLC

(57) ABSTRACT

A modular refueling system for an aircraft includes a modular bay recessed within the aircraft. The modular bay includes a modular bay interface. The modular refueling system includes a plurality of payload modules each having a respective function and a payload interface adapted to connect to at least a portion of the modular bay interface. The plurality of payload modules includes an aerial refueling module. The payload modules are interchangeably insertable into the modular bay to enable the modular bay to support the functions of the payload modules. The aerial refueling module is insertable into the modular bay to enable the aircraft to provide fuel to recipient aircraft during flight.

20 Claims, 16 Drawing Sheets

(56) References Cited

U.S. PATENT DOCUMENTS

| | | | |
|---|---|---|---|
| 4,736,910 | A | 4/1988 | O'Quinn et al. |
| 5,803,405 | A | 9/1998 | Ellis et al. |
| 6,065,720 | A | 5/2000 | Ash et al. |
| 6,536,711 | B1 | 3/2003 | Conway et al. |
| 6,663,047 | B1 | 12/2003 | Arata |
| 6,932,297 | B1 | 8/2005 | Steindl et al. |
| 7,237,750 | B2 | 7/2007 | Chiu et al. |
| 8,292,220 | B1 | 10/2012 | Westra et al. |
| 2005/0178912 | A1 | 8/2005 | Whelan et al. |
| 2005/0204910 | A1* | 9/2005 | Padan .................... B64D 1/04 89/1.813 |
| 2007/0034739 | A1 | 2/2007 | Yoeli |
| 2008/0054121 | A1 | 3/2008 | Yoeli |
| 2009/0314894 | A1 | 12/2009 | Frisch et al. |
| 2010/0140406 | A1 | 6/2010 | Walton et al. |
| 2010/0258672 | A1* | 10/2010 | Grabmeier ........... B64C 39/024 244/118.2 |
| 2015/0210392 | A1 | 7/2015 | Hodge et al. |
| 2015/0298807 | A1 | 10/2015 | Chun et al. |
| 2016/0144950 | A1* | 5/2016 | Ferguson ............... B64C 23/00 244/130 |
| 2016/0229536 | A1 | 8/2016 | Aull et al. |
| 2016/0288906 | A1* | 10/2016 | Christof .................. B64D 1/08 |
| 2016/0311553 | A1* | 10/2016 | Alber ..................... B64D 39/04 |
| 2017/0043879 | A1* | 2/2017 | Perry .................... B64D 37/04 |
| 2017/0101181 | A1 | 4/2017 | Mern et al. |

OTHER PUBLICATIONS

European Search Report; Application No. 17192070.5; EPO; dated Nov. 16, 2017.

\* cited by examiner

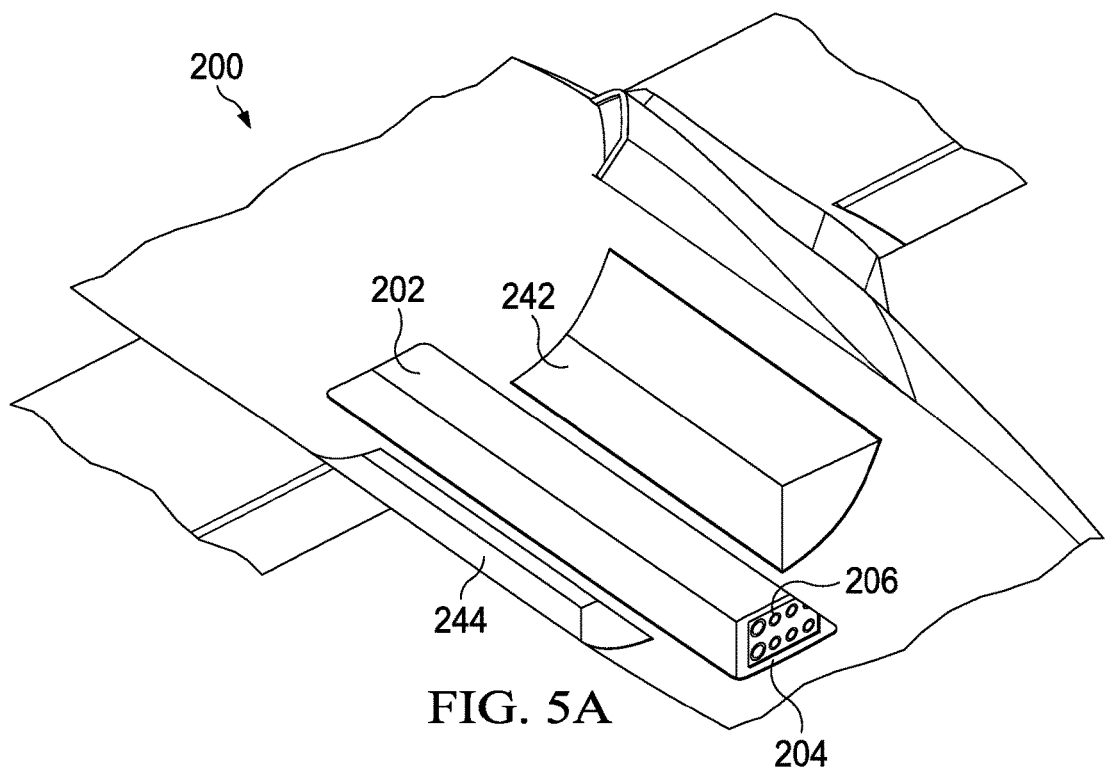
FIG. 5A
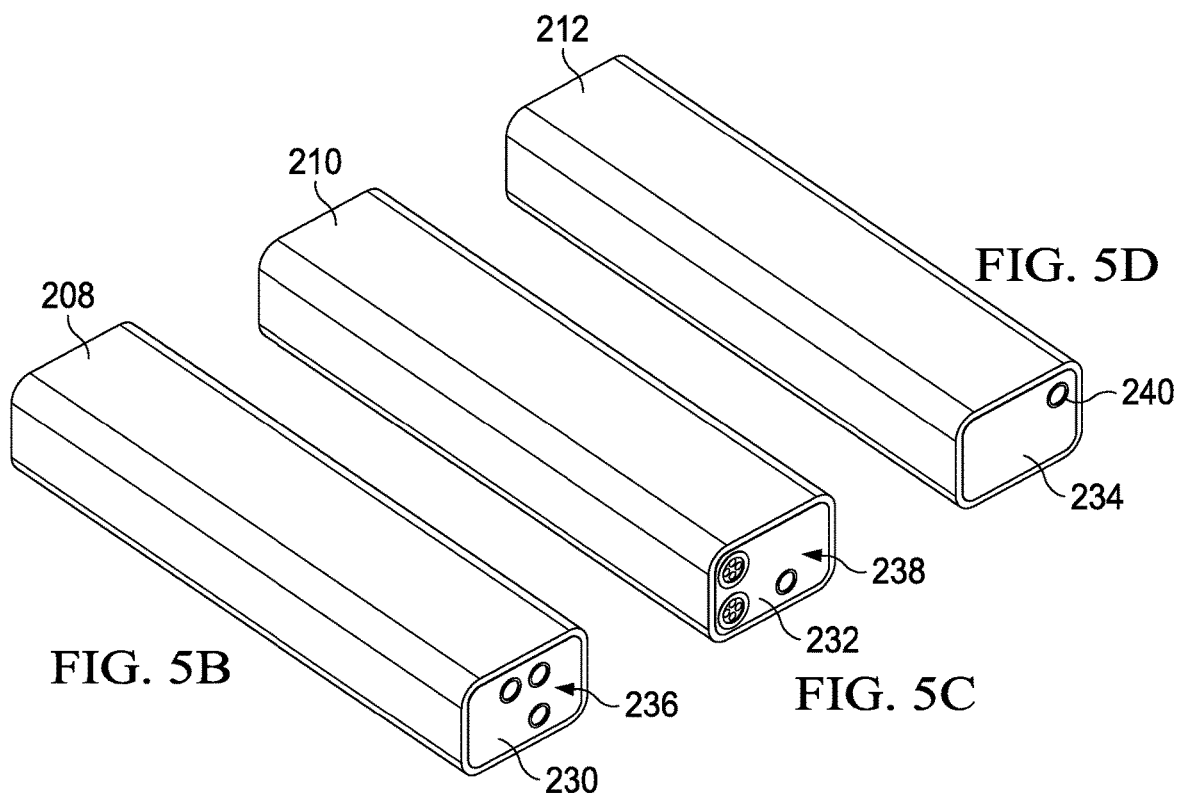
FIG. 5B
FIG. 5C
FIG. 5D

MODULAR REFUELING SYSTEMS FOR AIRCRAFT

CROSS-REFERENCE TO RELATED APPLICATIONS

This is a continuation-in-part of co-pending application Ser. No. 15/270,053 filed Sep. 20, 2016.

TECHNICAL FIELD OF THE DISCLOSURE

The present disclosure relates, in general, to modular refueling systems operable for use on aircraft and, in particular, to aircraft having one or more modular bays each adapted to receive a payload module selected from a group of two or more interchangeable payload modules including an aerial refueling module.

BACKGROUND

Some aircraft are equipped to carry multiple payload types. For example, a military aircraft may include a radar system for reconnaissance and one or more weapons systems, such as missiles, mounted thereon. In some cases, payloads are externally mounted on the aircraft, which increases the amount of drag experienced by the aircraft in flight. Typically, payload bays on conventional aircraft are built and intended for a single type of payload, and therefore do not support multipurpose use. For example, aerial refueling systems, which enable an aircraft to provide fuel to another aircraft during flight, are typically permanent installations on aircraft and are incapable of being easily removed or interchanged with other systems, such as a radar or weapons system. Some current aerial refueling systems are externally mounted on aircraft, increasing the overall drag experienced by the aircraft. Such externally mounted systems are incapable of delivering fuel from a fuel tank inside the aircraft, and are instead limited to delivering the fuel stored in the externally mounted system. Accordingly, a need has arisen for a modular payload system operable to receive mission dependent payloads including, but not limited to, an aerial refueling module that minimizes drag and maximizes the amount of fuel deliverable to other aircraft during aerial refueling.

SUMMARY

In a first aspect, the present disclosure is directed to a modular refueling system for an aircraft including a modular bay recessed within the aircraft. The modular bay includes a modular bay interface. The modular refueling system includes a plurality of payload modules each having a respective function and a payload interface adapted to connect to at least a portion of the modular bay interface. The plurality of payload modules includes an aerial refueling module. The payload modules are interchangeably insertable into the modular bay to enable the modular bay to support the functions of the payload modules. The aerial refueling module is insertable into the modular bay to enable the aircraft to provide fuel to recipient aircraft during flight.

In some embodiments, the aircraft may include a fuselage having an underside, the modular bay recessed within the underside of the fuselage. In certain embodiments, at least a portion of the exterior surface of the aerial refueling module may be substantially flush with the underside of the fuselage when the aerial refueling module is inserted into the modular bay, thereby reducing drag of the aircraft. In some embodiments, the modular bay may include a central modular bay and a side modular bay. In certain embodiments, the aerial refueling module may be a central payload module adapted to be inserted into the central modular bay. In some embodiments, the aerial refueling module may be a side payload module adapted to be inserted into the side modular bay. In certain embodiments, the side modular bay may flank the central modular bay. In some embodiments, the payload interface of the aerial refueling module may connect to at least a portion of the modular bay interface in response to the aerial refueling module being inserted into the modular bay. In certain embodiments, the aerial refueling module may include a hose and a drogue that is extendable from the aircraft to enable a connection to the recipient aircraft. In some embodiments, the aerial refueling module may include a reel. The hose may be adapted to wind around the reel such that the hose extends from the aircraft in response to the reel rotating a first direction and retracts toward the aircraft in response to the reel rotating a second, opposite direction. In certain embodiments, the aerial refueling module may include a reel motor adapted to rotate the reel. In some embodiments, the aerial refueling module may include a drogue receiver adapted to receive the drogue when the hose is retracted. In certain embodiments, the drogue receiver may protrude from the exterior surface of the aerial refueling module. In some embodiments, the aerial refueling module may include a fuel pump operable to pump fuel from the aircraft to the recipient aircraft.

In a second aspect, the present disclosure is directed to an aircraft including a fuselage having an underside, and a modular bay recessed within the underside of the fuselage. The modular bay includes a modular bay interface. The aircraft includes a plurality of payload modules each having a respective function and a payload interface adapted to connect to at least a portion of the modular bay interface. The plurality of payload modules includes an aerial refueling module. The payload modules are interchangeably insertable into the modular bay to enable the modular bay to support the functions of the payload modules. The aerial refueling module is insertable into the modular bay to enable the aircraft to provide fuel to recipient aircraft during flight.

In some embodiments, the aircraft may be an unmanned aerial system or a tiltrotor aircraft. In certain embodiments, the aircraft may include a fuel cell, and the aerial refueling module may be adapted to provide fuel from the fuel cell to the recipient aircraft during flight. In some embodiments, the payload interface of the aerial refueling module may be adapted to connect to at least a portion of the modular bay interface to establish fluid communication between the fuel cell and the aerial refueling module. In certain embodiments, the modular bay interface may include a fuel line connector, and the payload interface of the aerial refueling module may be adapted to connect to the fuel line connector to establish fluid communication between the fuel cell and the aerial refueling module. In some embodiments, the aircraft may include a power source adapted to provide electrical energy, and the modular bay interface may include a power connector. In such embodiments, the payload interface of the aerial refueling module may be adapted to connect to the power connector to establish electrical communication between the power source and the aerial refueling module. In certain embodiments, the fuel cell may be a fuselage fuel cell. In some embodiments, the fuel cell may include a plurality of fuel cells including a fuselage fuel cell and a wing fuel cell. In such embodiments, the aerial refueling module may be adapted to provide fuel from at least one of the plurality of fuel cells to the recipient aircraft during flight.

BRIEF DESCRIPTION OF THE DRAWINGS

For a more complete understanding of the features and advantages of the present disclosure, reference is now made to the detailed description along with the accompanying schematic figures in which corresponding numerals in the different figures refer to corresponding parts and in which:

FIGS. 5A-5D are isometric views of modular bays and interchangeable payload modules in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
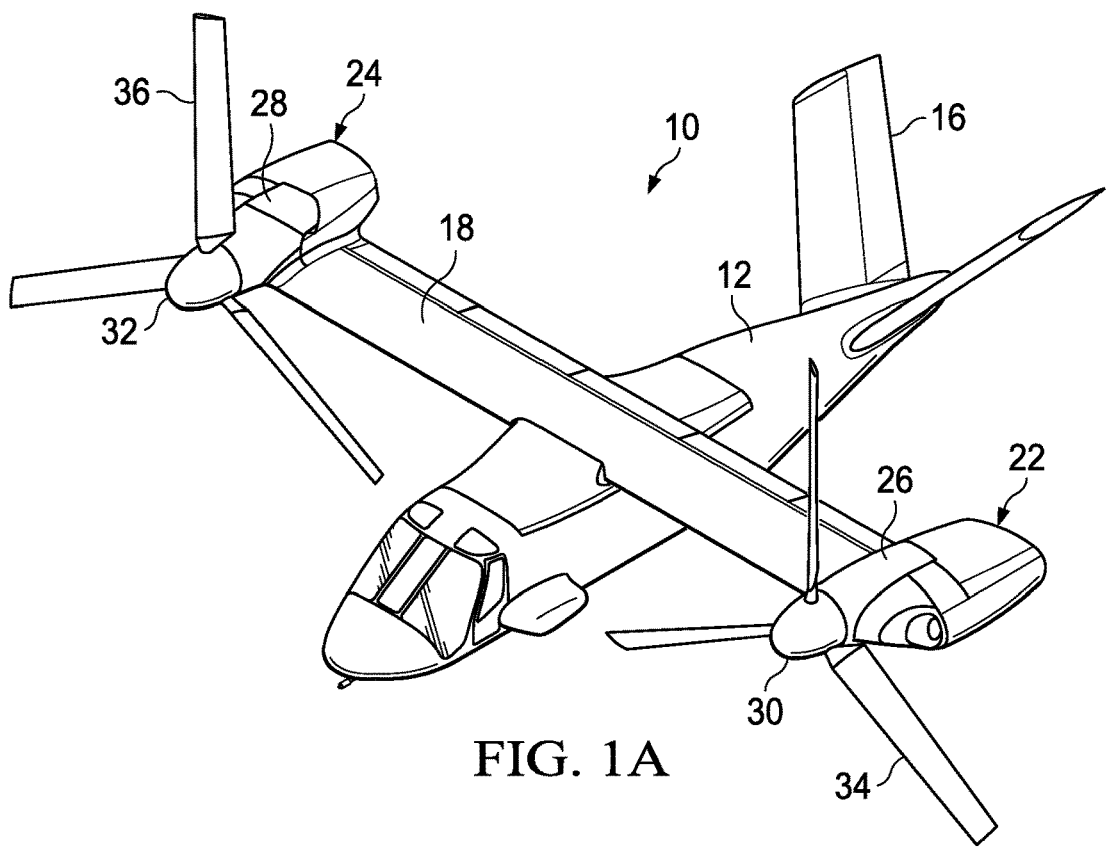
FIGS. 1A-1C are schematic illustrations of a tiltrotor aircraft having a modular bay in accordance with embodiments of the present disclosure.
Figure 1B:
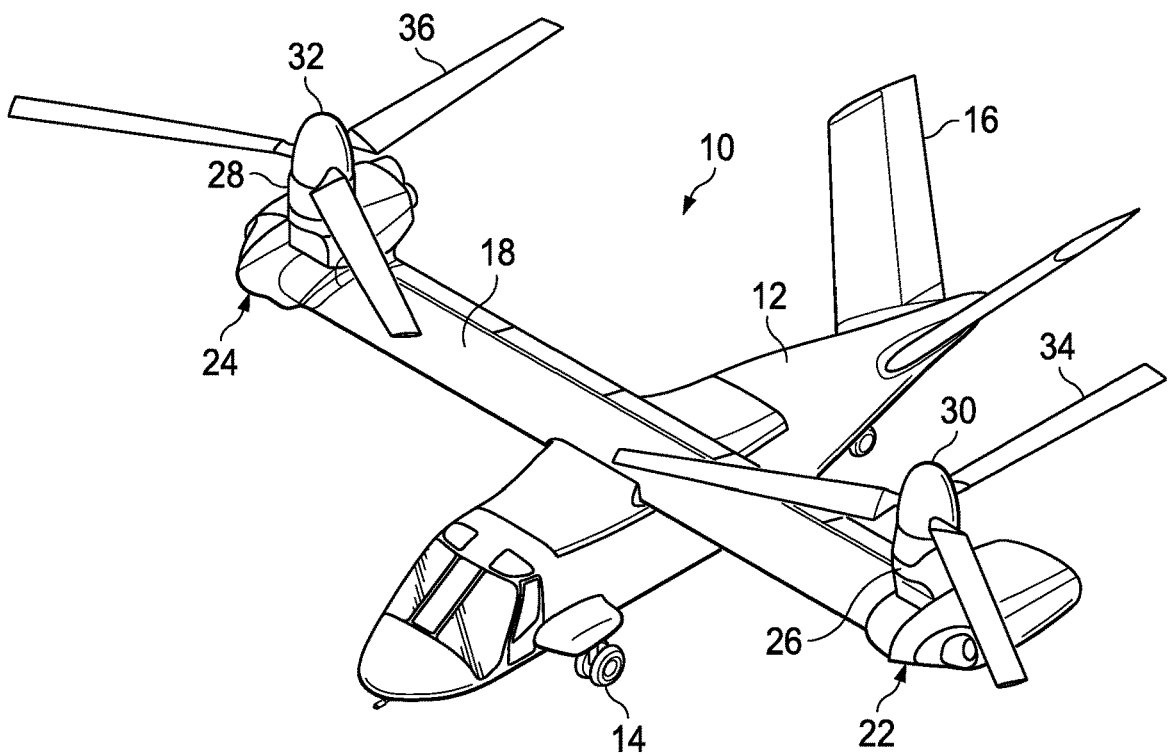
Figure 1C:
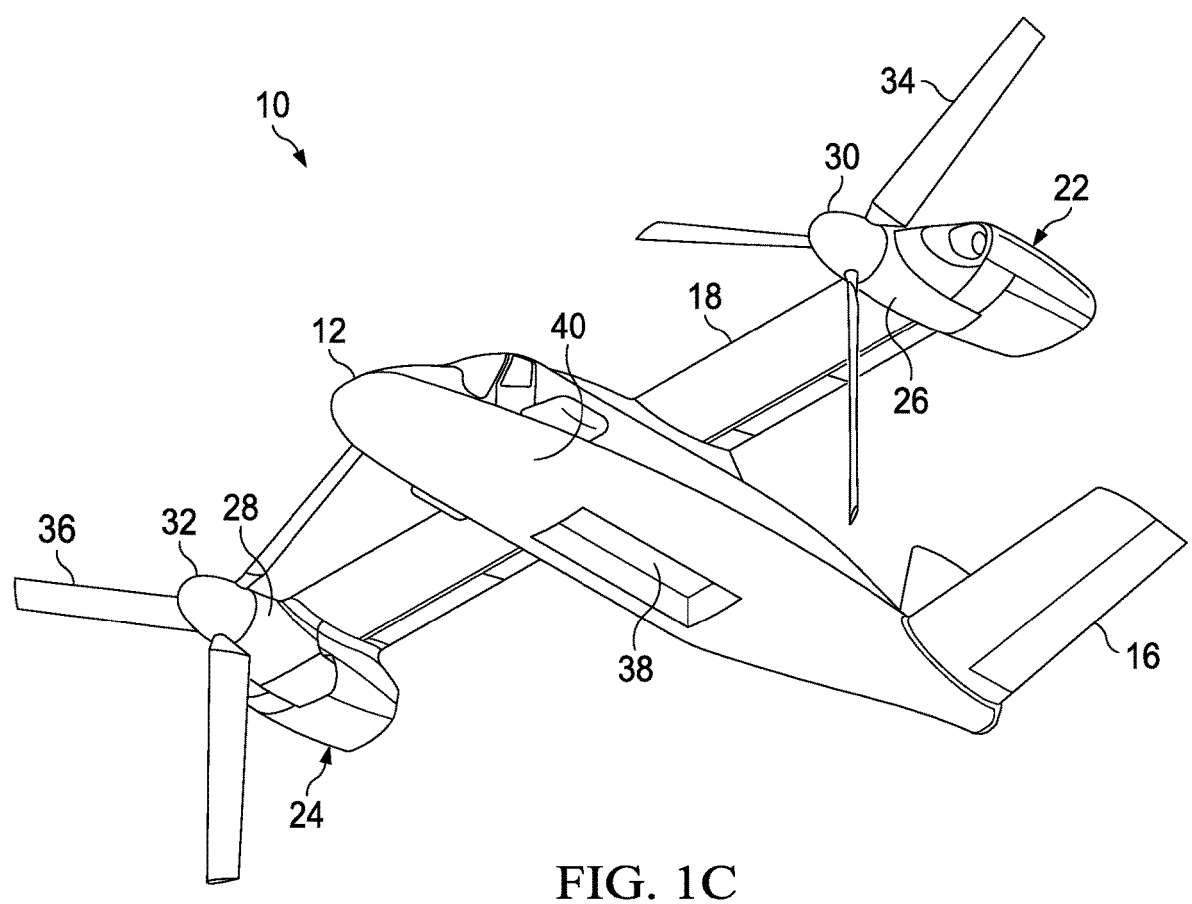
Figure 2:
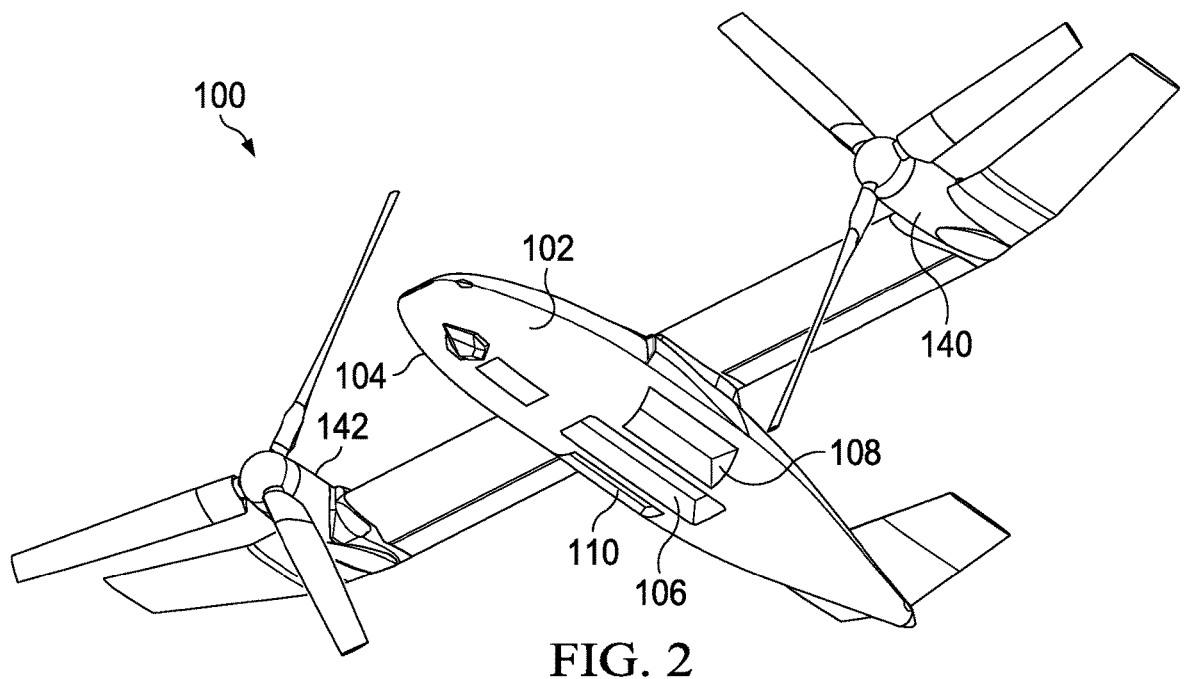
FIG. 2 is an isometric view of an unmanned aerial vehicle having modular bays in accordance with embodiments of the present disclosure.

Referring to FIGS. 1A-1C in the drawings, a tiltrotor aircraft is schematically illustrated and generally designated 10. Tiltrotor aircraft 10 includes a fuselage 12, landing gear 14, tail member 16, wing 18 and pylon assemblies 22, 24. Wing 18 is supported by fuselage 12. Pylon assemblies 22, 24 are positioned, respectively, proximate the outboard ends of wing 18. Rotatably mounted on pylon assemblies 22, 24 are rotor assemblies 26, 28, which respectively include proprotors 30, 32. In some embodiments, pylon assemblies 22, 24 may each include a nacelle having an engine, transmission and/or gearbox to provide torque and rotational energy to proprotors 30, 32. Proprotors 30, 32 each include a plurality of proprotor blade assemblies 34, 36, respectively. The position of rotor assemblies 26, 28 and the pitch of proprotor blade assemblies 34, 36 are determined using a flight control system to selectively control the direction, thrust and lift of tiltrotor aircraft 10. FIGS. 1A and 1C illustrate tiltrotor aircraft 10 in airplane, or forward flight, mode, in which proprotors 30, 32 are positioned to rotate in a substantially vertical plane to provide a forward thrust while a lifting force is supplied by wing 18 such that tiltrotor aircraft 10 flies much like a conventional propeller driven aircraft. FIG. 1B illustrates tiltrotor aircraft 10 in helicopter, or vertical takeoff and landing (VTOL) flight, mode, in which proprotors 30, 32 are positioned to rotate in a substantially horizontal plane to provide a lifting thrust such that tiltrotor aircraft 10 flies much like a conventional helicopter. Tiltrotor aircraft 10 can also be operated such that proprotors 30, 32 are selectively positioned between airplane mode and helicopter mode, which can be referred to as conversion flight mode.

Referring specifically to FIG. 1C, a modular bay 38 is recessed, fully or partially, on an underside 40 of fuselage 12. Modular bay 38 is adapted to receive one of a plurality of payload modules that each has a respective or different function, such as a weapons module and/or an aerial refueling module. The various payload modules of the illustrative embodiments are interchangeably insertable into modular bay 38, thereby enabling modular bay 38 to support or contain any of the functions of the payload modules and providing a high degree of operational adaptability for tiltrotor aircraft 10. By recessing modular bay 38, a payload module may be fully or partially "internalized" within fuselage 12, thereby avoiding a drag penalty during flight and improving the cruise efficiency and endurance of tiltrotor aircraft 10. Avoiding such a drag penalty may be especially important in unmanned aerial vehicle missions in which endurance is a priority. In other embodiments, modular bay 38 may be recessed on the top, front, rear, port or starboard side of fuselage 12.

While the illustrated embodiment shows a single modular bay, tiltrotor aircraft 10 made include any number of modular bays, which may be uniform or non-uniform in size, shape or other characteristics. Although modular bay 38 has been illustrated in the context of tiltrotor aircraft 10, it will be understood by those of ordinary skill in the art that modular bay 38 can be implemented in a variety of ways on a variety of aircraft, including aircraft that can benefit from conveniently interchangeable payloads. Modular bay 38 may be implemented on tiltwing aircraft, quad tiltrotor aircraft, unmanned aircraft, such as an unmanned aerial system, airplanes, helicopters and the like. As such, those skilled in the art will recognize that modular bay 38 can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 2 and 3A-3H, an unmanned aerial vehicle having a modular payload system is schematically illustrated and generally designated 100. Underside 102 of fuselage 104 includes a central modular bay 106 and side modular bays 108, 110. In the illustrated embodiment, side modular bays 108, 110 flank central modular bay 106. Central modular bay 106 and side modular bays 108, 110 are also abreast relative to one another. Central modular bay 106 is sized differently than side modular bays 108, 110, allowing the modular bays to accept different sized payload modules. In one non-limiting example, side modular bays 108, 110 may be used for sensors and air-to-ground weapons payloads, and central modular bay 106, which is long, slender and located along a centerline of unmanned aerial vehicle 100, may be used for oversized payloads such as torpedoes, aerial refueling and air-to-air weapons, thereby increasing the mission capabilities beyond what is usually available in other unmanned aerial vehicles of similar size.

Figures 3A, 3B, 3C:
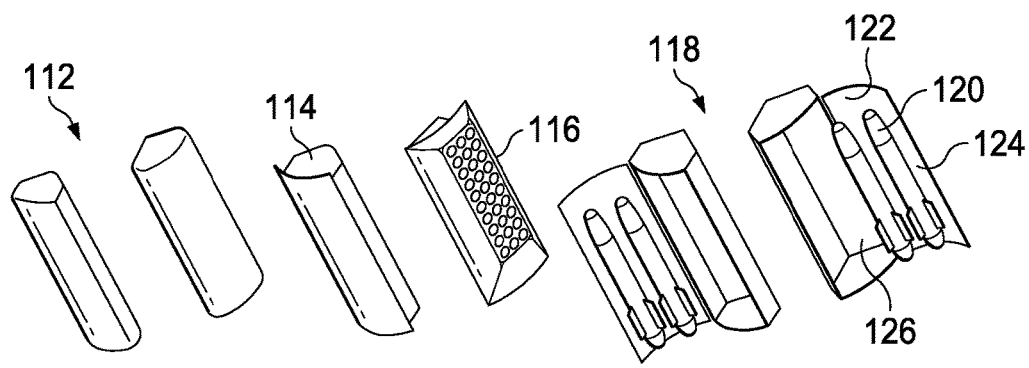
FIGS. 3A-3H are isometric views of various payload modules having different functions in accordance with embodiments of the present disclosure.

FIGS. 3A-3C show various payload modules, having different respective functions, which are interchangeably insertable into side modular bays 108, 110. Side modular bays 108, 110 are sized to receive the side payload modules shown in FIGS. 3A-3C. FIG. 3A illustrates fuel modules 112, which are capable of carrying fuel tanks or bags to be used by unmanned aerial vehicle 100. FIG. 3B illustrates a light detection and ranging (LIDAR) module 114 and a sonobuoy launcher module 116. The sonobuoy launcher module 116 may be any size, such as a 30 "G" size. LIDAR module 114 and sonobuoy launcher module 116 are air reconnaissance and anti-submarine warfare modules, respectively, that allow unmanned aerial vehicle 100 to perform reconnaissance operations. FIG. 3C illustrates weapons modules 118 that include missiles 120 mounted on an inner surface 122 of a bay door 124. Weapons modules 118 form an interior cavity 126 adapted to carry, or contain, missiles 120 when bay door 124 is closed. Bay door 124 is adapted to open in response to a command from unmanned aerial vehicle 100, or from elsewhere, to expose missiles 120. Weapons modules 118 may each include actuation to open and close bay door 124. In one non-limiting example, each of the weapons modules 118 includes a weapons mount on inner surface 122, associated electrical power and control for missiles 120 and bay door 124 as well as an actuator for bay doors 124. Non-limiting examples of missiles 120 are air-to-ground missiles such as Hellfire or JAGM missiles.

Figures 3D, 3E, 3F, 3G, 3H:
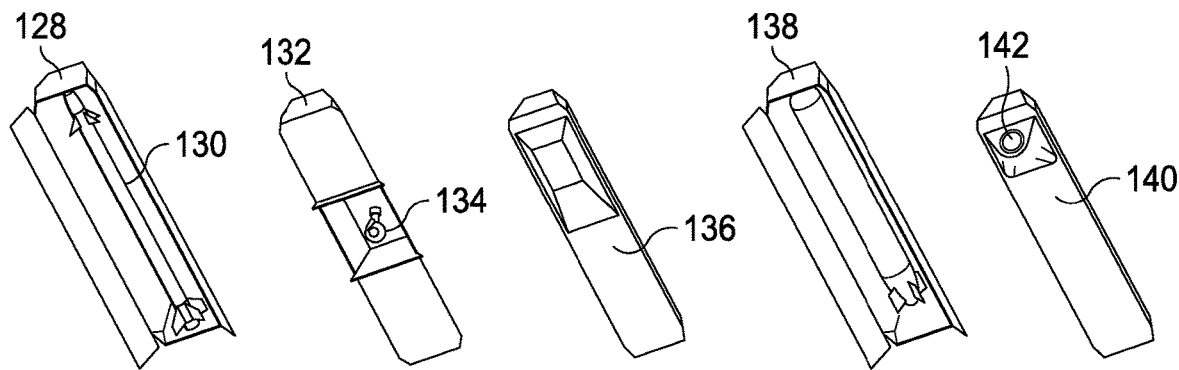

FIGS. 3D-3H show various payload modules, having different respective functions, which are interchangeably insertable into central modular bay 106. Central modular bay 106 is sized to receive any of the central payload modules shown in FIGS. 3D-3H. FIG. 3D shows a weapons module 128 that includes a short range air-to-air missile 130, such as an AIM-9 Sidewinder missile. Weapons module 128 has two bay doors, each of which may function analogously to bay door 124 in FIG. 3C. FIG. 3E illustrates a combination module 132 that includes a cargo hook 134 as well as a deck lock and 600 pounds of fuel. Combination modules, such as combination module 132, allow more than one function to be integrated into a single payload module. FIG. 3F shows a reconnaissance module 136, such as a 360 degree surface radar or multispectral sensor. FIG. 3G illustrates an anti-submarine warfare module 138. In the illustrated embodiment, anti-submarine warfare module 138 includes an MK50 torpedo. FIG. 3H illustrates an aerial refueling module 140 having an extendable drogue 142 used to provide fuel to other aircraft during flight.

The wide range of functions of the payload modules shown in FIGS. 3A-3H are exemplary of the wide array of functions that are supported by the modular payload system of unmanned aerial vehicle 100. The payload modules shown in FIGS. 3A-3C are interchangeable in modular bays 108, 110 and the payload modules shown in FIGS. 3D-3H are interchangeable in modular bay 106, thus allowing unmanned aerial vehicle 100 to perform the various functions of the payload modules and implement a wide range of operational missions by simply interchanging payload modules in modular bays 106, 108, 110. In contrast to current aircraft, in which a bay or mount is purpose-built for a single type of payload, the payloads of unmanned aerial vehicle 100 may be customized to each mission. Also, by receiving the various payload modules on underside 102 of fuselage 104, which are underneath the wings and rotors of unmanned aerial vehicle 100, center of gravity balance issues may be avoided, which can be especially important on tiltrotor aircraft, such as unmanned aerial vehicle 100, due to the ability to move pylons 140, 142 between helicopter and airplane modes.

Figure 4:
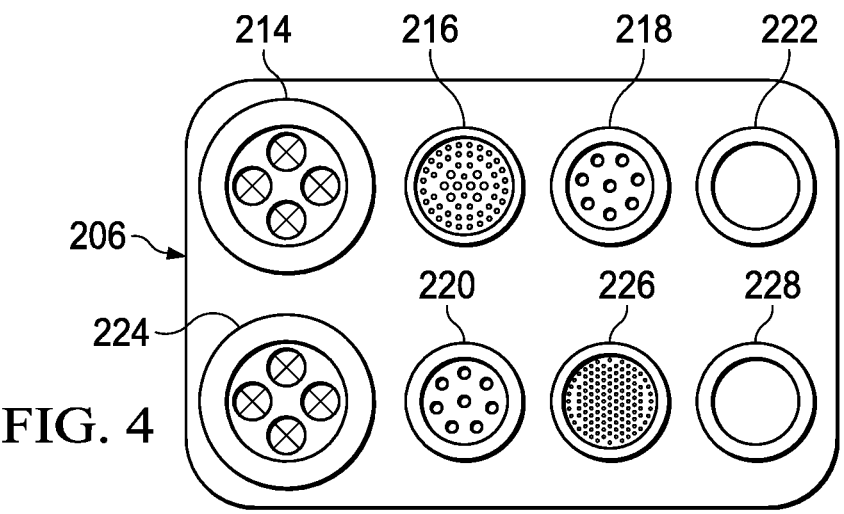
FIG. 4 is a front view of a modular bay interface in accordance with embodiments of the present disclosure.

Referring to FIGS. 4, 5A-5D, 6 and 7, a modular payload system is schematically illustrated and generally designated 200. One or more walls 204 within unmanned aerial vehicle 200 define central modular bay 202. One of the walls 204 may include modular bay interface 206. Modular bay interface 206 may include one or more connectors to enable communication with payload modules 208, 210, 212 shown in FIGS. 5B-5D. Referring specifically to FIG. 4, modular bay interface 206 includes two different types of power connectors 214, 216, two different types of imagery connectors 218, 220, fuel line connector 222, ground connector 224, data bus connector 226 and cooling connector 228. Cooling provisions, if required, may also be integrated into a bay door of a payload module, which may be changed with the payload. Data bus connector 226, or other connections on modular bay interface 206, may include pin connections. Data bus connector 226 may include control capabilities to allow control of a payload module. Such a control connection may also be separate from data bus connector 226. Connectors 214, 216, 218, 220, 222, 224, 226, 228 are substantially flush, or integrated, with wall 204 on which modular bay interface 206 is located.

Payload modules 208, 210, 212, which are interchangeably insertable into central modular bay 202, have respective payload interfaces 230, 232, 234. Payload interfaces 230, 232, 234 are adapted to connect to at least a portion of connectors 214, 216, 218, 220, 222, 224, 226, 228 of modular bay interface 206 to provide electrical, hydraulic, data, fluid or other communication between central modular bay 202 and the inserted payload module. Payload modules 208, 210, 212 have different functions, and thus have different payload connectors on their respective payload interfaces 230, 232, 234. Payload modules 208, 210, 212 need not utilize all of connectors 214, 216, 218, 220, 222, 224, 226, 228 of modular bay interface 206. Specifically, payload module 208 in FIG. 5B is an air reconnaissance module, such as a radar, that includes data, power and imagery payload connectors 236 that are connectable, or matable, with power connector 216, imagery connector 218 and data bus connector 226 of modular bay interface 206. Payload module 210 of FIG. 5C is a weapons module, such as a missile bay, that includes payload connectors 238 that connect to power connector 214, ground connector 224 and data bus connector 226 of modular bay interface 206 to enable the functions of the weapons therein. Payload module 212 in FIG. 5D may be a fuel or aerial refueling module that includes a payload connector 240 that connects to fuel line connector 222 of modular bay interface 206 to establish fluid communication between payload module 212 and central modular bay 202. In some embodiments, payload connector 240 and fuel line connector 222 may be a quick disconnect connection. Payload module 212 may also include a fuel pump in some embodiments, in which case payload interface 234 may include a power payload connector to provide power to the fuel pump.

Payload interfaces 230, 232, 234 are positioned on payload modules 208, 210, 212 such that payload interfaces 230, 232, 234 are adjacent modular bay interface 206 when one of payload modules 208, 210, 212 is inserted in modular bay 206. In some embodiments, payload connectors 236, 238, 240 connect to the complementary portion of connectors 214, 216, 218, 220, 222, 224, 226, 228 in response to one of payload modules 208, 210, 212 being inserted into central modular bay 202. In other embodiments, the connections between payload connectors 236, 238, 240 and the complementary portion of connectors 214, 216, 218, 220, 222, 224, 226, 228 may be performed manually by a person. Because modular bay interface 206 is able to connect to a wide variety of payload modules, such as payload modules 208, 210, 212, central modular bay 202 is able to support any function performable by a payload module, thus providing an aircraft with a wide range of adaptability to the particular mission or operational circumstances. It will be appreciated by one of ordinary skill in the art that central modular bay 202 may have more than one modular bay interface, and payload modules 208, 210, 212 may each have more than one payload interface. Side modular bays 242, 244 may also each include a modular bay interface (not shown) analogous to modular bay interface 206, and the payload modules insertable within side modular bays 242, 244 may include matable payload interfaces.

Figure 6:
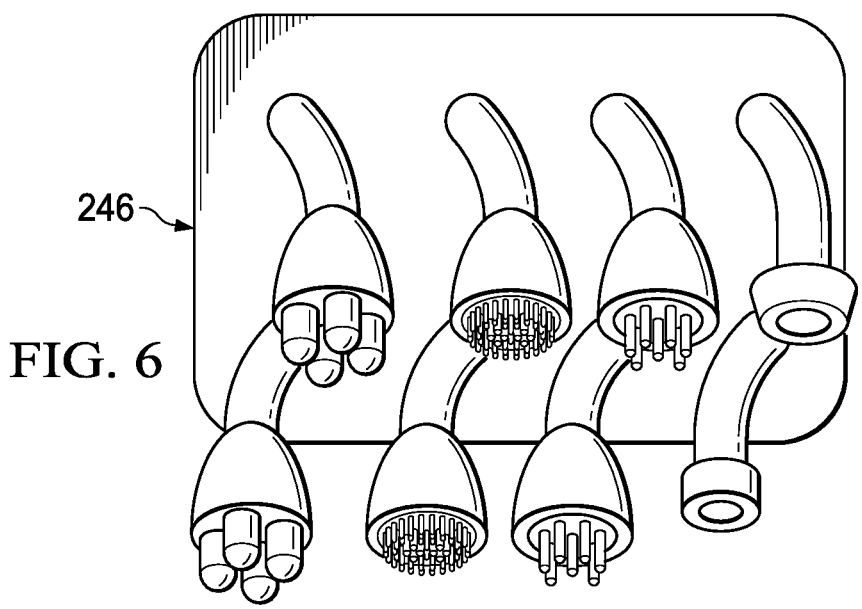
FIG. 6 is a front view of a modular bay interface in accordance with embodiments of the present disclosure.
Figure 7:
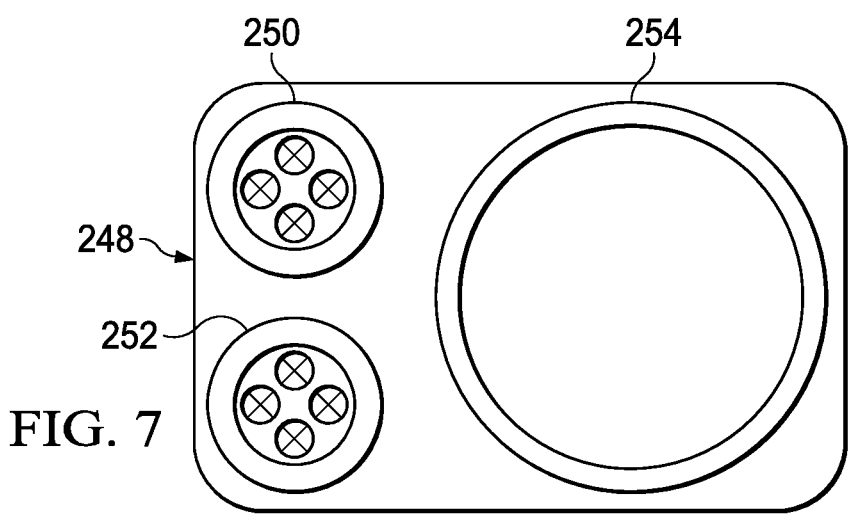
FIG. 7 is a front view of a modular bay interface in accordance with embodiments of the present disclosure.
Figure 8A:
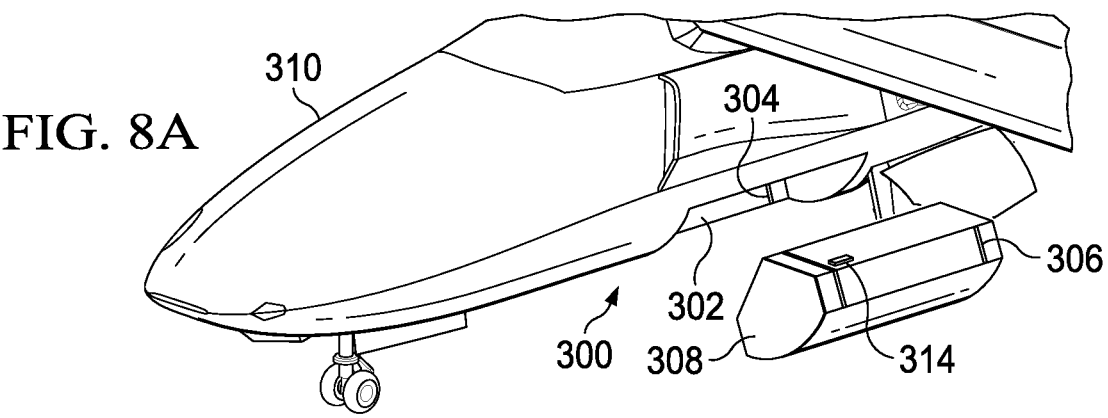
FIGS. 8A-8D are isometric views of an unmanned aerial vehicle with a modular bay in which a payload module is being inserted in accordance with embodiments of the present disclosure.
Figure 8B:
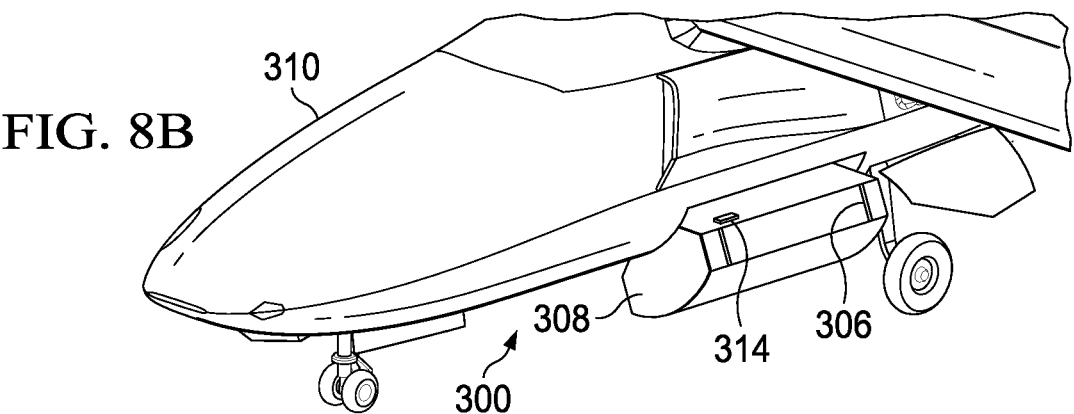
Figure 8C:
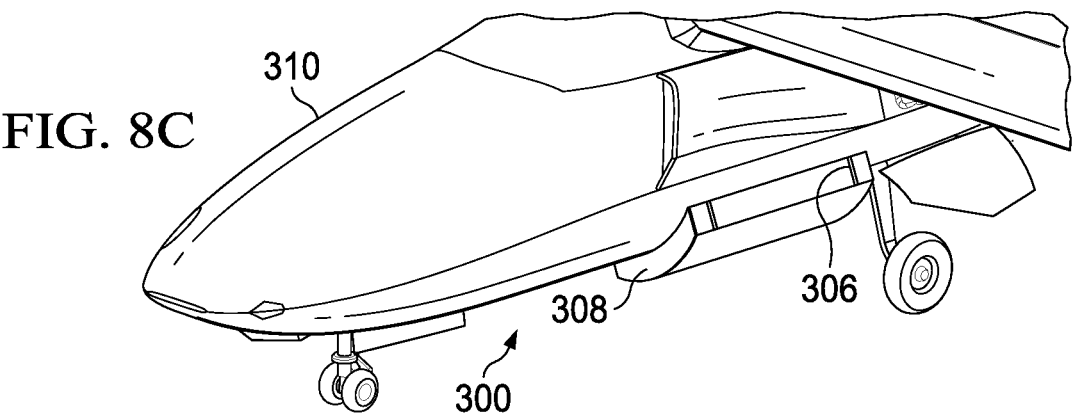
Figure 8D:
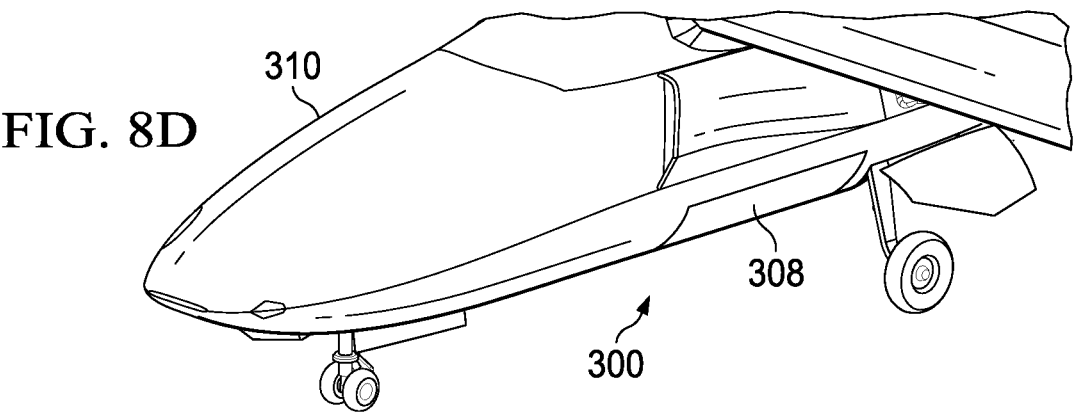
Figure 9A:
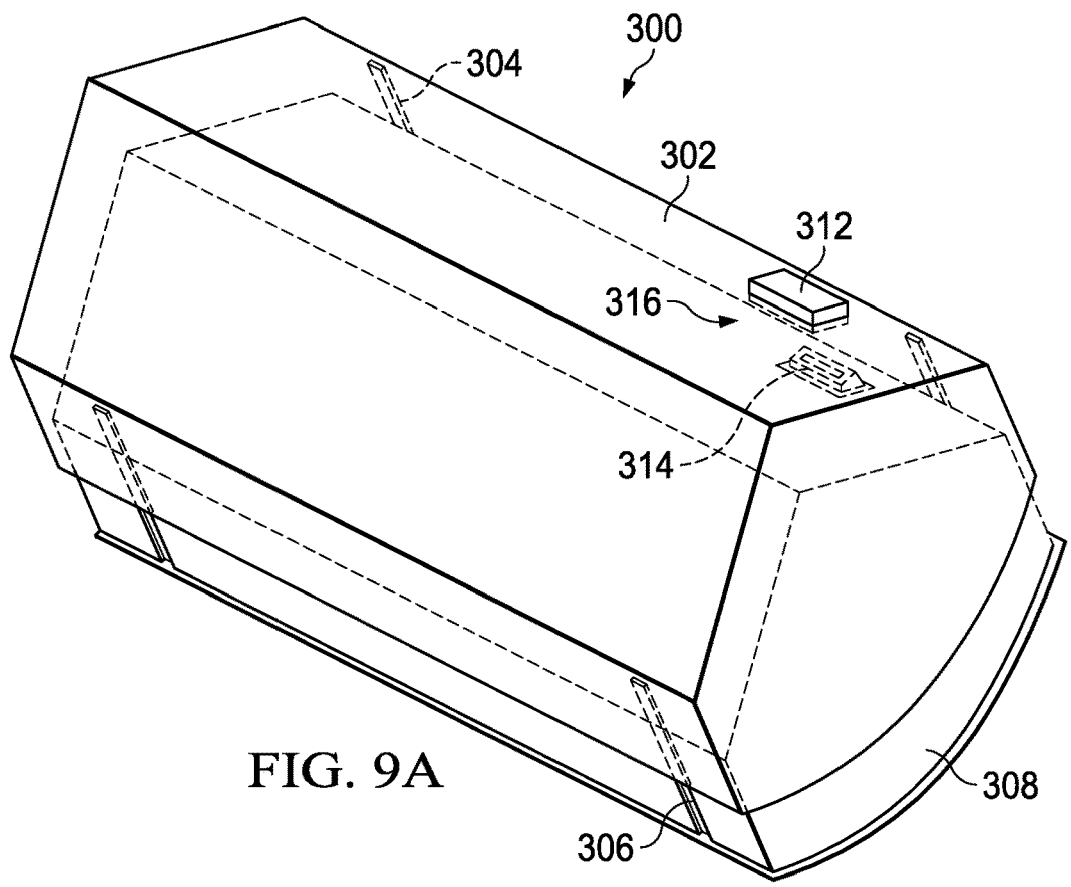
FIGS. 9A-9B are isometric views of a payload module being inserted into a modular bay in accordance with embodiments of the present disclosure.
Figure 9B:
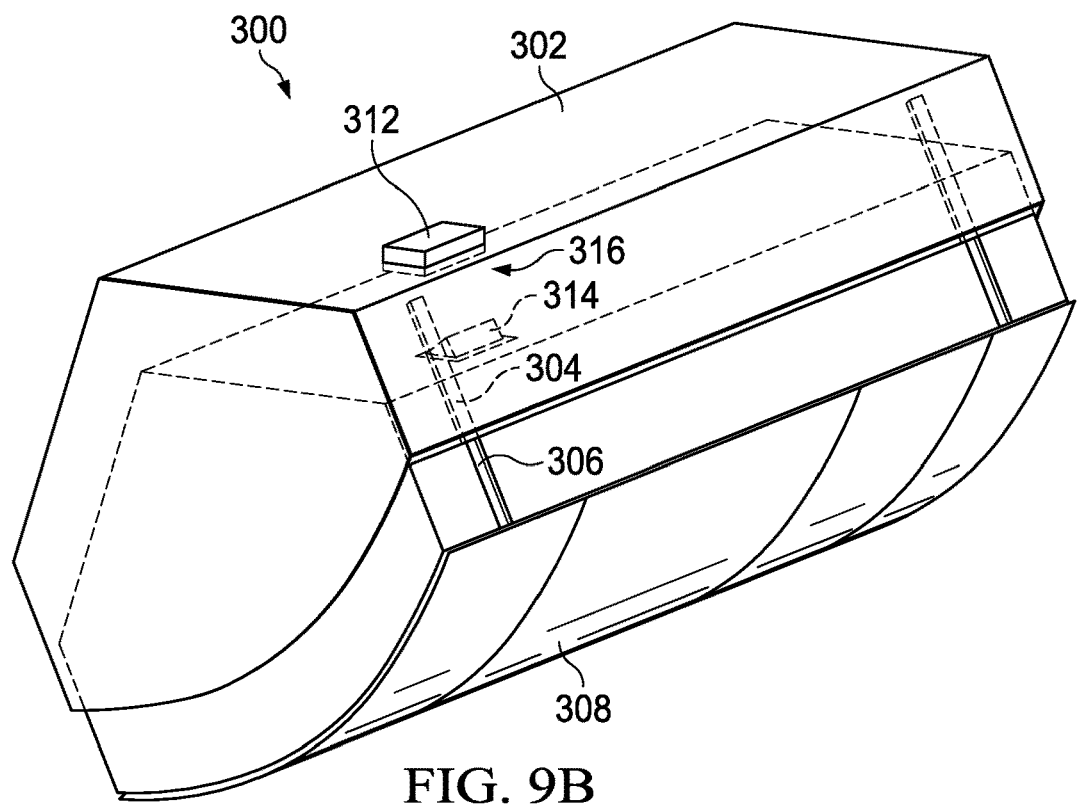
Figure 10A:
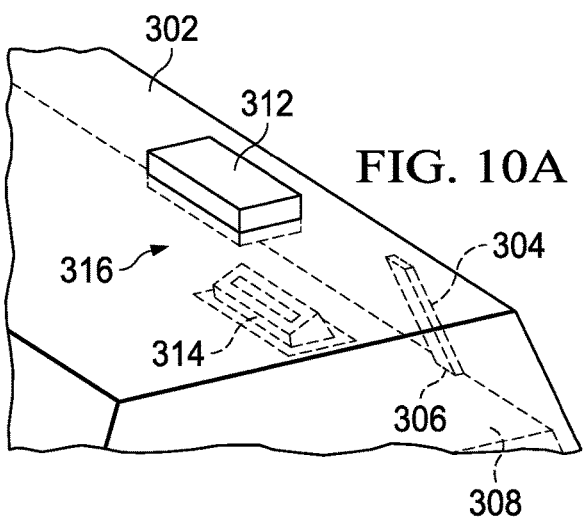
FIGS. 10A-10D are isometric views of a quick disconnect junction in accordance with embodiments of the present disclosure.
Figure 10B:
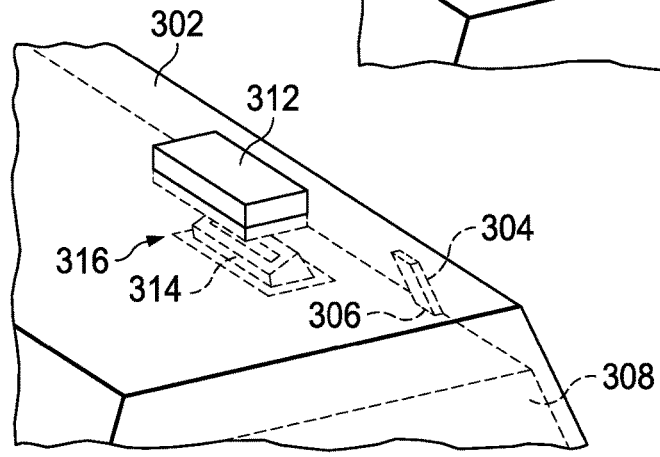
Figure 10C:
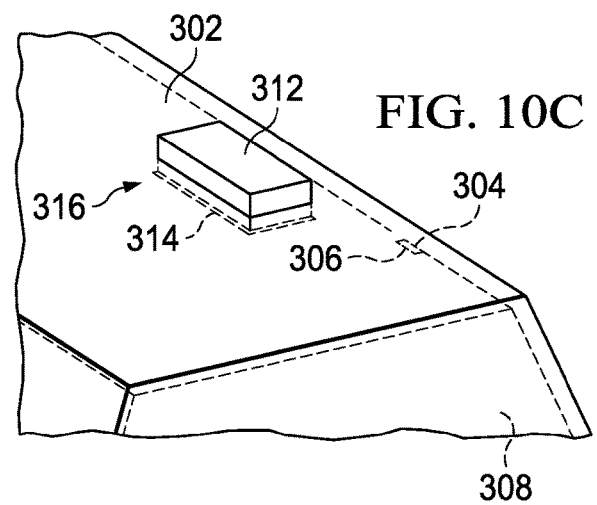
Figure 10D:
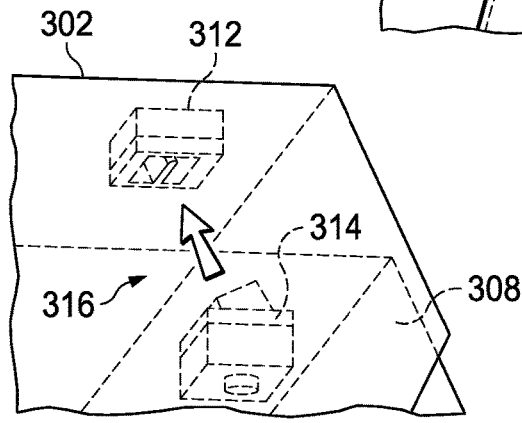

Referring specifically to FIG. 6, modular bay interface 246 includes connectors that are similar to connectors 214, 216, 218, 220, 222, 224, 226, 228 of modular bay interface 206, except that the connectors on modular bay interface 246 protrude from wall 204 on which modular bay interface 246 is mounted. Such "pigtail" connectors may, in some embodiments, be extendable and retractable relative to wall 204. The pigtail connectors on modular bay interface 246 may be used to lengthen the reach of the connectors to better enable a connection with a payload module inserted in central modular bay 202. It will be appreciated by one of ordinary skill in the art that the connectors on modular bay interfaces 206, 246 may be male connectors, female connectors or a combination thereof, and payload connectors 236, 238, 240 may be complementary to the connectors on modular bay interfaces 206, 246 to allow a matable connection. Referring to FIG. 7, modular bay interface 248 includes power connector 250, ground connector 252 and fuel line connector 254. In contrast to fuel line connector 222 in FIG. 4, fuel line connector 254 is enlarged to allow a larger fuel transfer rate to and/or from the payload module. For example, enlarged fuel line connector 254 may be utilized when the payload module is an aerial refueling module, thereby allowing for a sufficient amount of fuel to be pumped from an onboard fuel cell to a recipient aircraft via the aerial refueling module. Fuel line connector 254 may be sized to accommodate any fuel transfer rate, as determined by the functionality and properties of the payload module for which fuel line connector 254 is utilized.

Referring to FIGS. 8A-8D, 9A-9B, 10A-10D and 11, a modular payload system is schematically illustrated and generally designated 300. Modular bay 302 includes tracks 304 that slidably engage with grooves 306 on payload module 308 to guide payload module 308 into modular bay 302. Tracks 304 and grooves 306 allow payload module 308 to be easily removed and installed in modular bay 302. Tracks 304 and grooves 306 also help to ensure that payload module 308 is properly inserted into modular bay 302, as illustrated in the progression of FIGS. 8A-8D. While modular payload system 300 is illustrated as having four tracks 304 and four grooves 306, modular payload system 300 may have any number of tracks and grooves. Furthermore, tracks 304 may be located on payload module 308 and grooves 306 may be located on modular bay 302. One of ordinary skill in the art will appreciate that other slidably engagable components, such as pairs of sliders with bearings therebetween, may be utilized to guide payload module 308 into modular bay 302. Payload module 308 may be locked into position with pins, brackets or other devices to ensure retention once payload module 308 has been fully inserted into modular bay 302.

As best seen in FIGS. 9A-9B and 10A-10D, the modular bay interface of modular bay 302 is a bay receptacle 312 and the payload interface of payload module 308 is a payload module receptacle 314 which together form a quick disconnect junction 316. Quick disconnect junction 316 may allow for electrical, hydraulic, data, fluid or other communication between unmanned aerial vehicle 310 and payload module 308. In the illustrated embodiment, quick disconnect junction 316 provides electrical communication between unmanned aerial vehicle 310 and payload module 308. Quick disconnect junction 316 allows for an easily connectable and disconnectable communication link between modular bay 302 and payload module 308. Tracks 304 and grooves 306 guide payload module 308 into modular bay 302 in such a way that bay receptacle 312 and payload module receptacle 314 connect and form a communication link in response to payload module 308 being inserted into modular bay 302. While bay receptacle 312 is located on a top wall of modular bay 302 and payload module receptacle 314 is correspondingly located on a top surface of payload module 308, bay receptacle 312 and payload module receptacle 314 may be located anywhere on modular bay 302 and payload module 308, respectively, that allows bay receptacle 312 and payload module receptacle 314 to engage in response to payload module 308 being pushed into or inserted into modular bay 302. In some embodiments, quick disconnect junction 316 may utilize pins to enable electrical or data communication, analogous to a docking station for a portable data processing system, such as a laptop computer.

Figure 11:
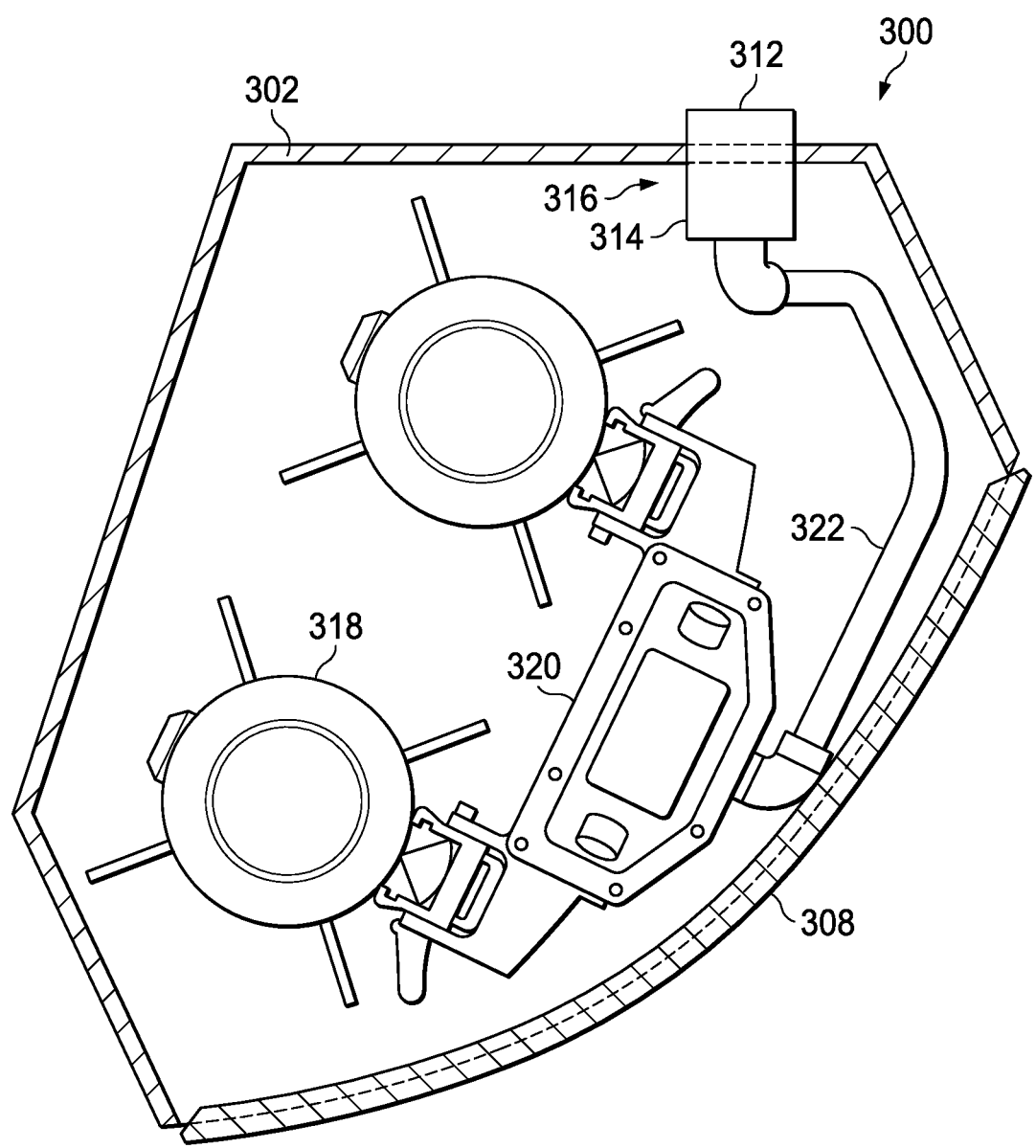
FIG. 11 is a cross-sectional view of a payload module inserted into a modular bay in accordance with embodiments of the present disclosure.

Referring specifically to FIG. 11, payload module 308 includes missiles 318 mounted within payload module 308 by a missile launcher support 320. Missiles 318 require power to launch properly. Such power is supplied by electrical connection 322 that provides electrical communication between payload module receptacle 314 and missiles 318 via missile launcher support 320. Thus, when payload module 308 is fully inserted into modular bay 302, thereby engaging quick disconnect junction 316, electrical communication is provided from unmanned aerial vehicle 310 to missiles 318. It will be appreciated by one of ordinary skill in the art that tracks 304, grooves 306 and quick disconnect junction 316 may be used on modular bays of any size, shape or orientation, such as central modular bay 202 in FIG. 5A.

Figure 12A:
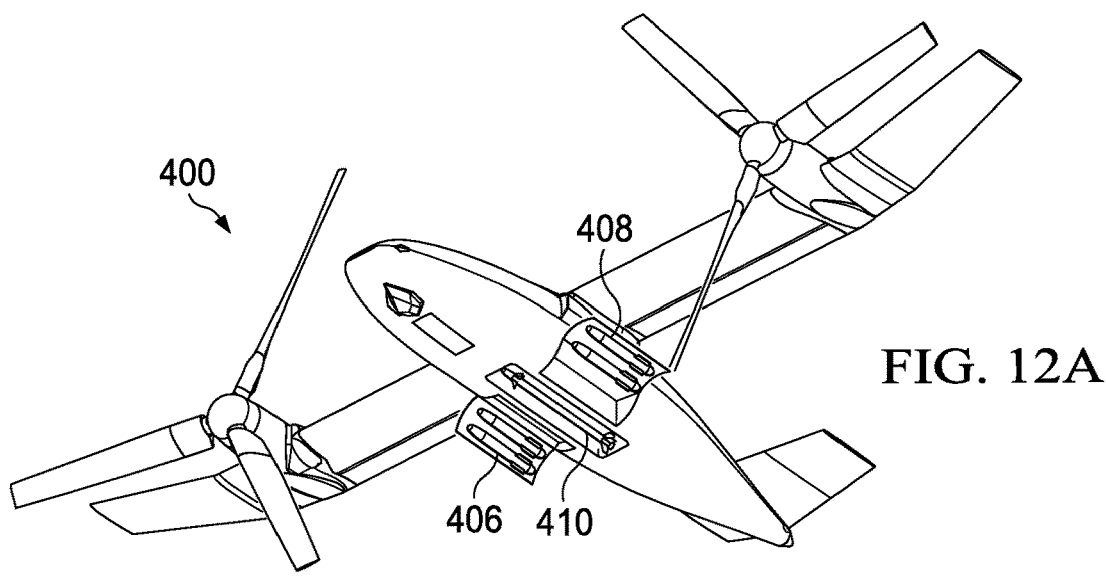
FIGS. 12A-12C are isometric views of an unmanned aerial vehicle having various combinations of payload modules inserted therein in accordance with embodiments of the present disclosure.
Figure 12B:
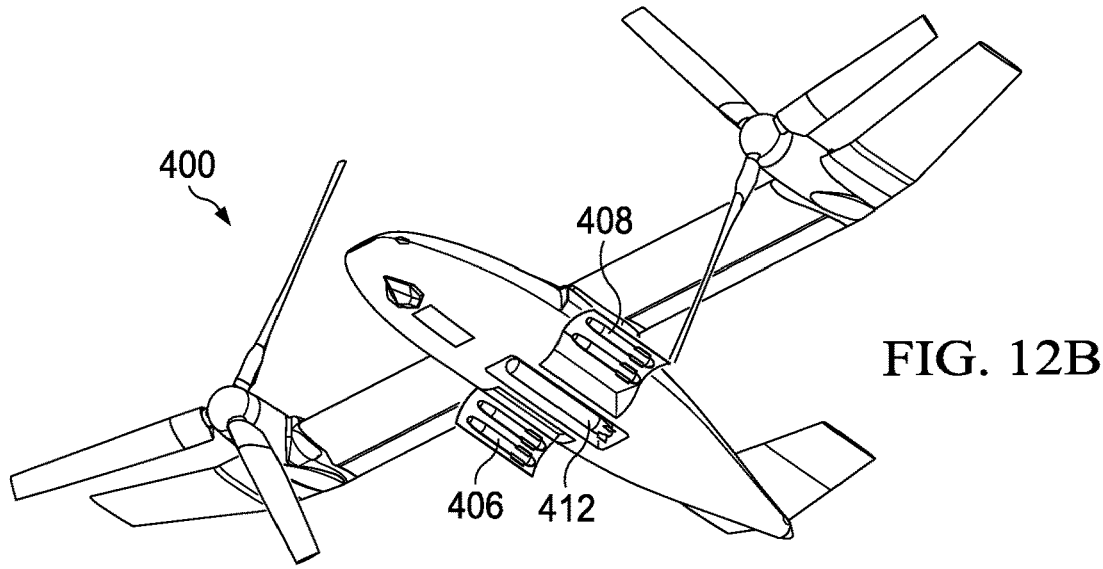
Figure 12C:
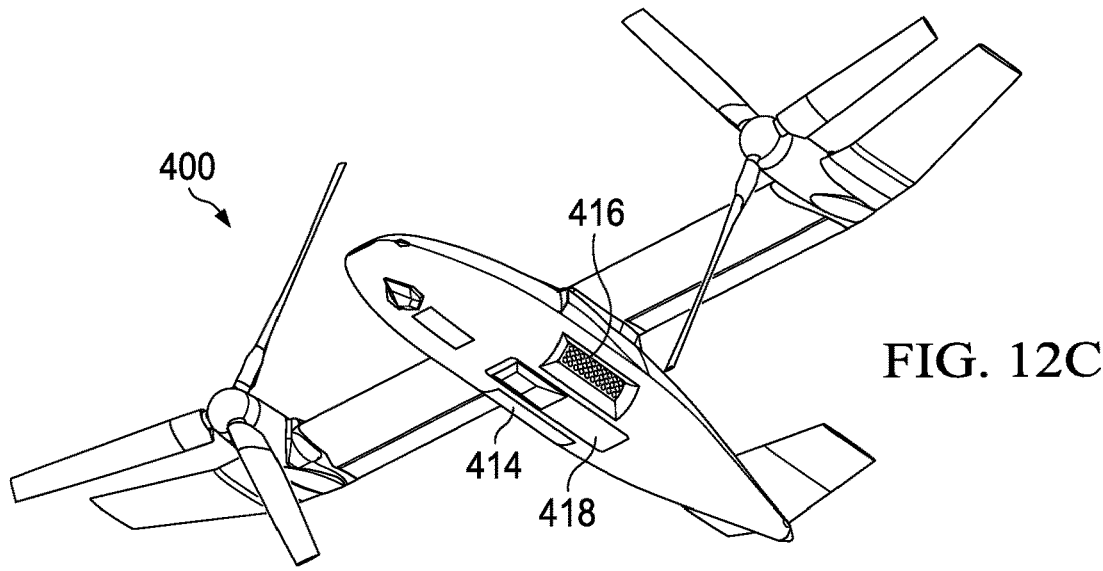

Referring to FIGS. 12A-12C in the drawings, an unmanned aerial vehicle having different payload configurations is schematically illustrated and generally designated 400. The three payload configurations of unmanned aerial vehicle 400 illustrate that the modular payload system of the illustrative embodiments allow a single aircraft to quickly and easily adapt to a particular mission simply by interchanging the payload modules inserted in the aircraft's modular bays. A single aircraft may change its purpose and operational capabilities from mission to mission by changing the payload modules inserted therein. For example, unmanned aerial vehicle 400 in FIG. 12A, which utilizes missiles for an enemy attack mission, may be quickly and easily changed into the surveillance aircraft in FIG. 12C, in which unmanned aerial vehicle 400 utilizes a variety of sensors. The modular payload system on unmanned aerial vehicle 400 eliminates the need for multiple aircraft to perform multiple mission types. For example, on an aircraft carrier, instead of storing different types of aircraft, each for a respective mission type, a single aircraft using the modular payload system of the illustrative embodiments may use interchangeable payload modules to perform different missions, thereby conserving space on the aircraft carrier. Payload modules may also be shared and interchanged among multiple aircraft that utilize the modular payload system.

FIGS. 12A-12C show different combinations of payload modules on unmanned aerial vehicle 400. In FIG. 12A, unmanned aerial vehicle 400 is adapted for air-to-air and air-to-surface attack. Specifically, unmanned aerial vehicle 400 includes Hellfire missiles 406, 408 for air-to-surface attack capability, and Sidewinder missile 410 for short range air-to-air attack capabilities. Unmanned aerial vehicle 400 in FIG. 12B is adapted for air-to-surface and anti-submarine attack, and includes Hellfire missiles 406, 408 and torpedo 412. Unmanned aerial vehicle 400 in FIG. 12C is adapted for surveillance missions, and includes LIDAR module 414, sonobuoy launcher 416 and radar 418. In yet other configurations, unmanned aerial vehicle 400 may include a deck lock system and cargo hook in a central modular bay and an automatic landing system in a side modular bay. Unmanned aerial vehicle 400 may also be equipped solely for anti-submarine operations, in which case unmanned aerial vehicle 400 may include a dipping sonar, a sonobuoy launcher and torpedoes in respective modular bays. In yet another combination of payload modules, unmanned aerial vehicle 400 may be equipped for anti-ship warfare and include Hellfire missiles, radar and an IR targeting sensor in respective modular bays. Indeed, the combinations of payload modules that may be utilized by unmanned aerial vehicle 400 are varied and numerous.

Figure 13A:
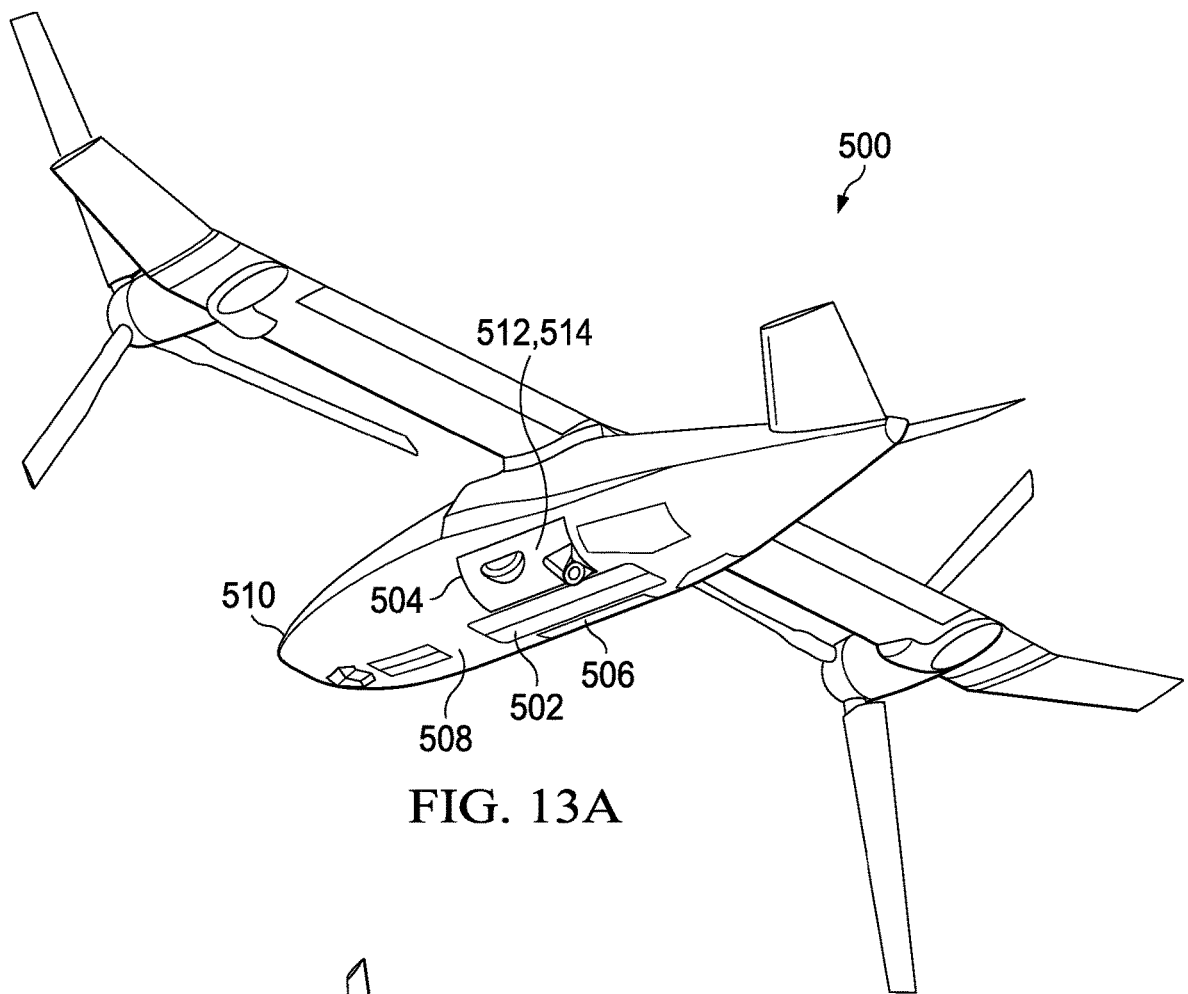
FIGS. 13A-13C are various views of an unmanned aerial vehicle having a modular refueling system in accordance with embodiments of the present disclosure.
Figure 13B:
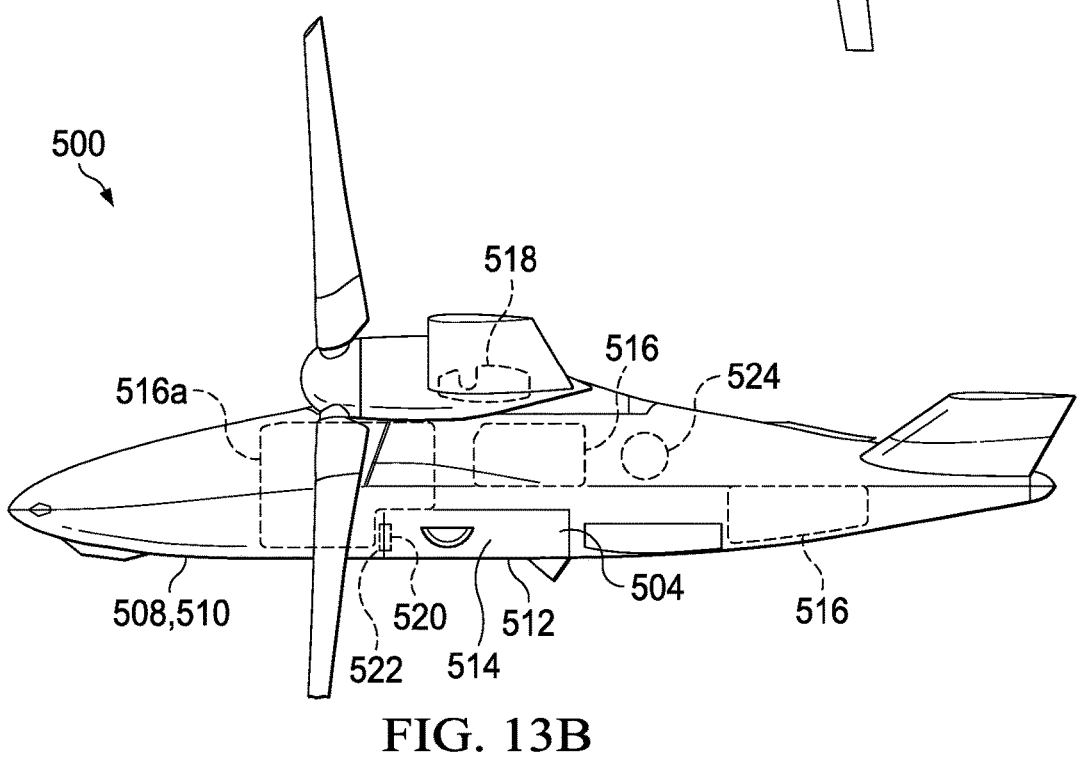
Figure 13C:
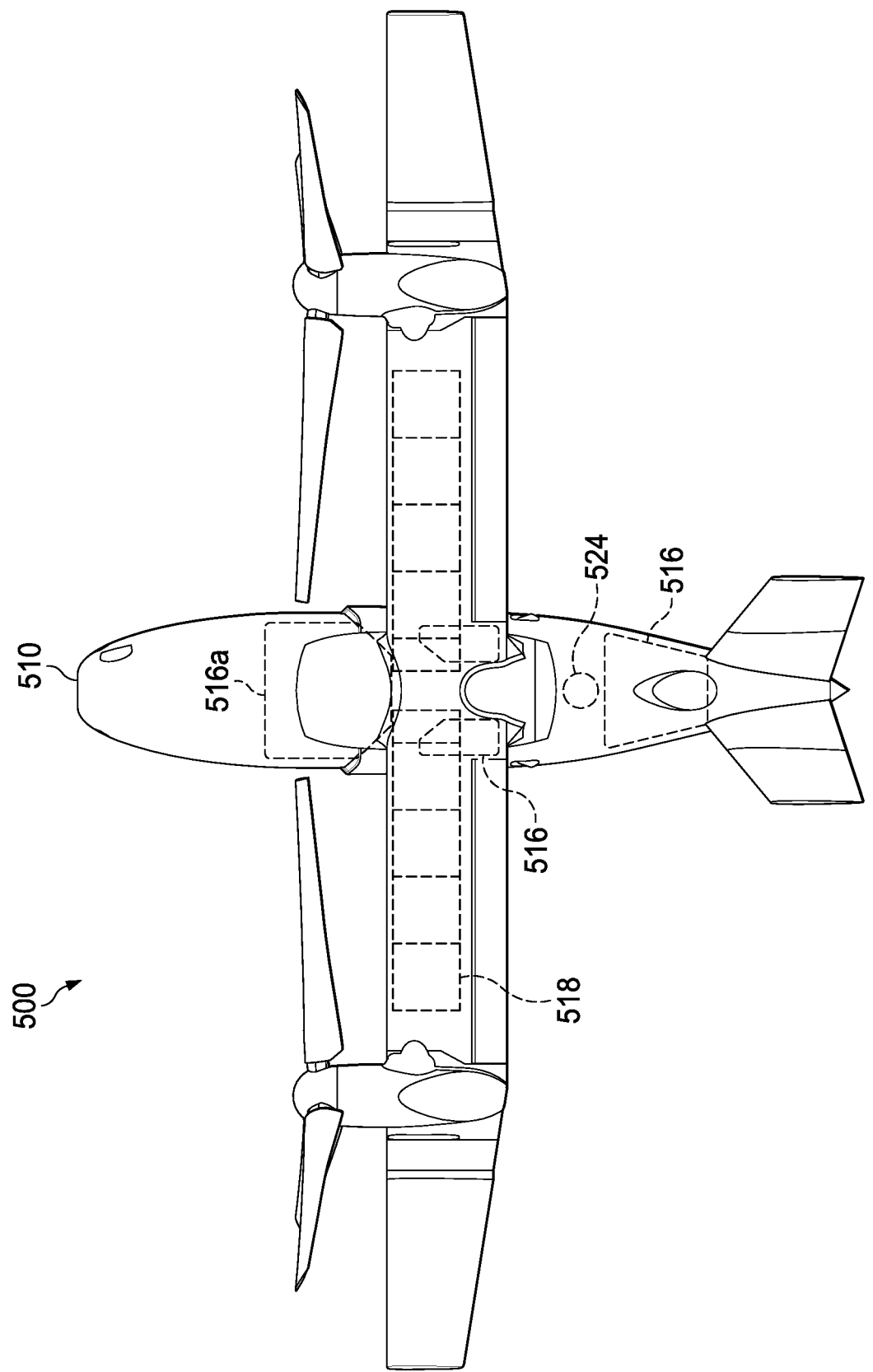

Referring to FIGS. 13A-13C in the drawings, a rotorcraft including a modular refueling system is schematically illustrated and generally designated 500. Rotorcraft 500 includes central modular bay 502 and side modular bays 504, 506 recessed within underside 508 of fuselage 510. In other embodiments, modular bays 502, 504 and/or 506 may be recessed within the top, front, rear, port or starboard side of fuselage 510. Side modular bays 504, 506 flank central modular bay 502. An aerial refueling module 512 is inserted into side modular bay 504 to enable rotorcraft 500 to provide fuel to other aircraft during flight. While in the illustrated embodiment aerial refueling module 512 is a side payload module sized and adapted to be inserted into side modular bay 504, in other embodiments aerial refueling module 512 may be a central payload module sized and adapted to be inserted into central modular bay 502. Aerial refueling module 512 may also be shaped to fit into side modular bay 506. Rotorcraft 500 may include any number of aerial refueling modules 512. For example, side modular bays 504, 506 or all modular bays 502, 504, 506 may each include a respective aerial refueling module. All or a portion of exterior surface 514 of aerial refueling module 512 are substantially flush with underside 508 of fuselage 510 when aerial refueling module 512 is inserted into side modular bay 504, thereby reducing the overall drag experienced by rotorcraft 500 during flight. In the illustrated embodiment, a majority of exterior surface 514 of aerial refueling module 512 is substantially flush with underside 508 of fuselage 510. Rotorcraft 500 is a tiltrotor aircraft and, in particular, an unmanned aerial system. In other embodiments, however, the modular refueling system may be implemented on other types of aircraft.

Rotorcraft 500 includes a number of fuselage fuel cells 516 and wing fuel cells 518. Fuel cells 516, 518 may be bags or bladders that are flexible, semi-rigid or rigid. For example, fuel cells 516, 518 may be fuel bags formed from Kevlar or rubber, among other materials. In other embodiments, fuel cells 516, 518 may be tanks formed from a rigid material, such as metal, polymer, plastic or any other rigid material. Rotorcraft 500 may include any number of fuel cells, and such fuel cells may be located inside rotorcraft 500 or coupled to the exterior of rotorcraft 500. Payload interface 520 of aerial refueling module 512 is adapted to connect to at least a portion of modular bay interface 522 to establish fluid communication between one or more of fuel cells 516, 518 and aerial refueling module 512. In particular, modular bay interface 522 may include a fuel line connector, such as fuel line connector 254 in FIG. 7, and payload interface 520 of aerial refueling module 512 may be adapted to connect to the fuel line connector to establish fluid communication between one or more of fuel cells 516, 518 and aerial refueling module 512. The fuel line connector on modular bay interface 522 may be any size to accommodate a suitable fuel transfer rate for refueling other aircraft. Modular bay interface 522 may also include a power connector, such as power connector 250 in FIG. 7. Payload interface 520 may connect to the power connector so that power source 524 provides power to the components of aerial refueling module 512. For example, power source 524 may be an electrical power source, such as a generator, and payload interface 520 may connect to the power connector of modular bay interface 522 to establish electrical communication between power source 524 and aerial refueling module 512. Power source 524 may also be a hydraulic power source, such as a hydraulic pump, an internal combustion power source, such as an engine, or any other type of power source.

Because aerial refueling module 512 may not be large enough to store a sufficient volume of fuel to refuel other aircraft, aerial refueling module 512 is able to deliver fuel from a fuel cell or source exterior to aerial refueling module 512 itself. In particular, aerial refueling module 512 provides fuel from one or more of fuel cells 516, 518 to recipient aircraft during flight. The fuel cell from which aerial refueling module 512 draws fuel may or may not be used to power the propulsion and other systems of rotorcraft 500. For example, forward fuselage fuel cell 516a may be reserved only for aerial refueling operations and not be used to power the propulsion systems of rotorcraft 500. In this example, the connection between payload interface 520 and modular bay interface 522 establishes fluid communication between forward fuselage fuel cell 516a and aerial refueling module 512. In other embodiments, fuel cells 516, 518 may be interconnected and both rotorcraft 500 and aerial refueling module 512 may draw upon fuel cells 516, 518 to perform their respective functions. The illustrative embodiments allow aerial refueling module 512 to use the fuel already on board rotorcraft 500 to refuel other aircraft, and is therefore not limited to the physical dimensions of aerial refueling module 512 to store fuel for aerial refueling operations. Aerial refueling module 512 may be particularly useful in aircraft, such as rotorcraft 500, in which a wing-mounted refueling pod may be impractical due to space and drag issues. Because aerial refueling module 512 and fuel cells 516, 518 from which fuel is drawn are recessed or located inside of rotorcraft 500, the drag issues of current exterior-mounted refueling pods are avoided. Aerial refueling module 512 may also be easily and advantageously installed and uninstalled from any one of modular bays 502, 504, 506 to allow rotorcraft 500 to be used for a large number of different operation types as described herein. It will be appreciated by one of ordinary skill in the art that aerial refueling module 512 may alternatively store fuel for aerial refueling operations, and that such fuel may be used in addition to or in lieu of the fuel drawn from fuel cells 516, 518.

Figure 14A:
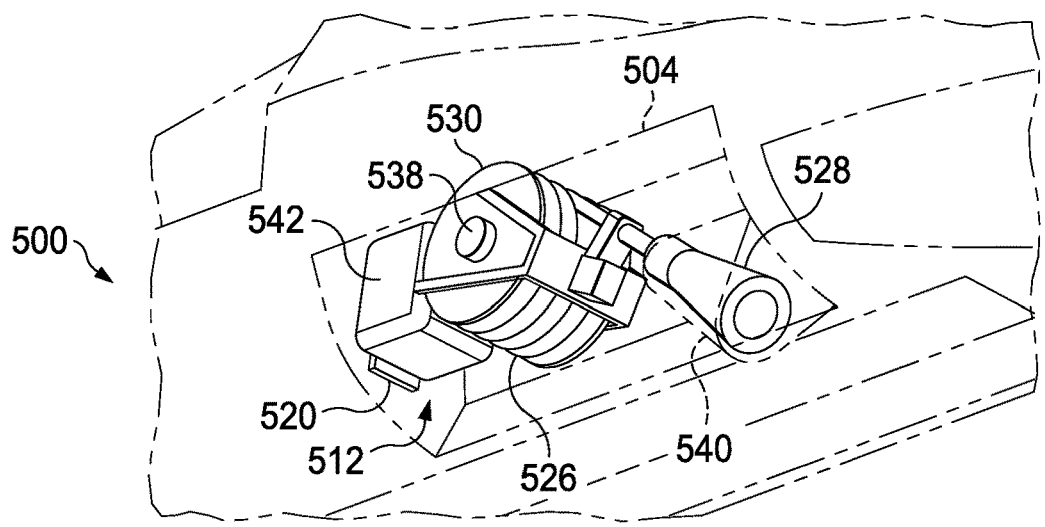
FIGS. 14A-14C are various views of an aerial refueling module in accordance with embodiments of the present disclosure.
Figure 14B:
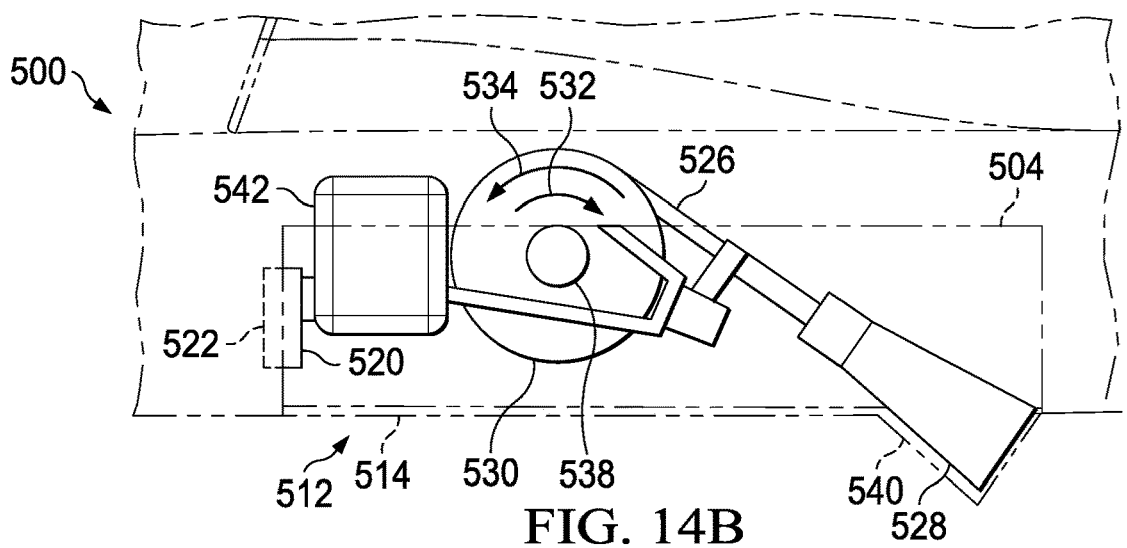
Figure 14C:
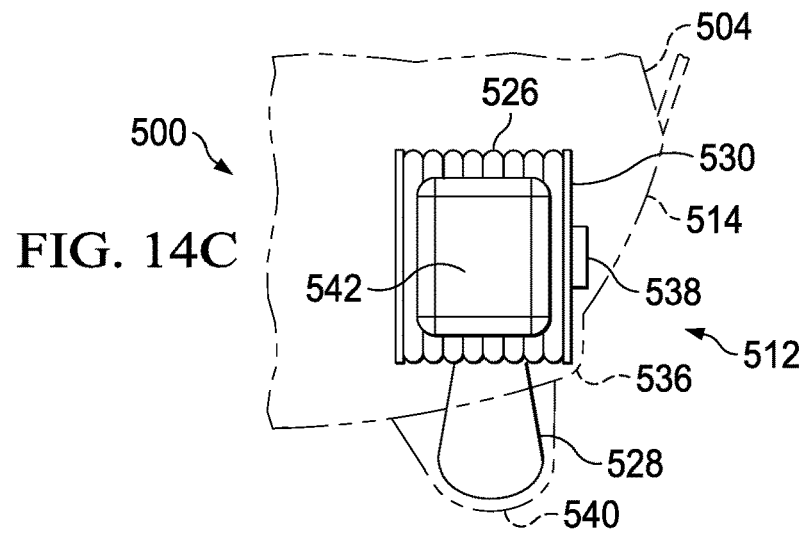

Referring to FIGS. 14A-14C in the drawings, aerial refueling module 512 includes a hose 526 and a drogue 528 that is extendable from rotorcraft 500 to enable a connection to recipient aircraft. Hose 526 winds around a reel 530 such that hose 526 extends from rotorcraft 500 when reel 530 rotates in direction 532 and retracts toward rotorcraft 500 when reel 530 rotates in opposite direction 534. In some embodiments, exterior surface 514 of aerial refueling module 512 may include a reel protrusion 536 to accommodate the size or shape of reel 530. A reel motor 538 rotates reel 530 in either direction 532, 534. When hose 526 is retracted, drogue 528 may dock, or be received, by a drogue receiver 540. Drogue receiver 540 protrudes from exterior surface 514 of aerial refueling module 512. In other embodiments, neither reel protrusion 536 nor drogue receiver 540 protrudes from exterior surface 514 of aerial refueling module 512. Aerial refueling module 512 also includes a fuel pump 542 operable to pump fuel from rotorcraft 500, such as from one or more of fuel cells 516, 518 in FIGS. 13A-13C, to a recipient aircraft. Fuel pump 542 may be any type of fuel pump, such as a mechanically, hydraulically or electrically powered fuel pump. For example, fuel pump 542 may be powered using the power connector of modular bay interface 522 to enable quick installation and removal of aerial refueling module 512 into and out of side modular bay 504. Payload interface 520 may connect to one or more connectors of modular bay interface 522 in response to aerial refueling module 512 being inserted into side modular bay 504. Such connection may be automatic upon insertion without any further need for a person to manually connect payload interface 520 to modular bay interface 522.

Figure 15A:
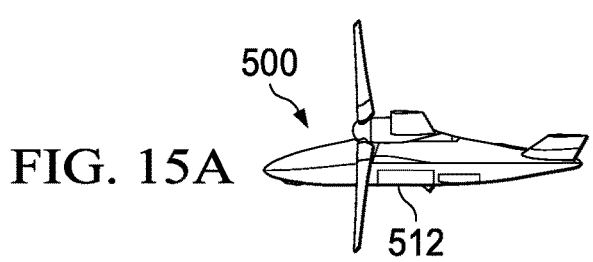
FIGS. 15A-15G are various views of an aerial refueling operation performed using a modular refueling system in accordance with embodiments of the present disclosure.
Figure 15B:
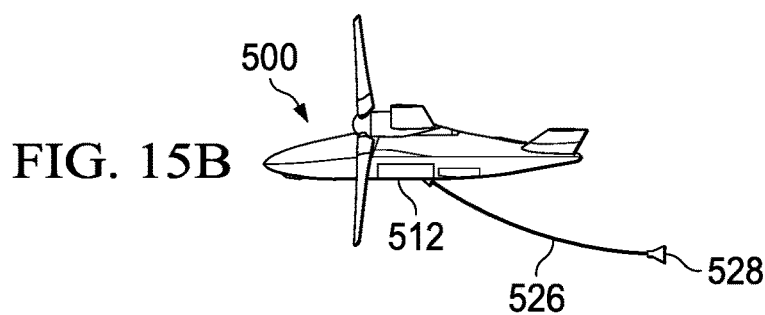
Figure 15C:
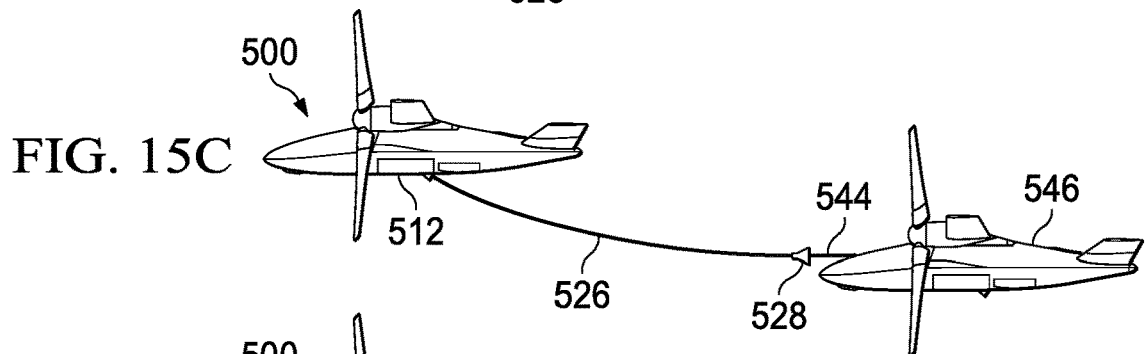
Figure 15D:
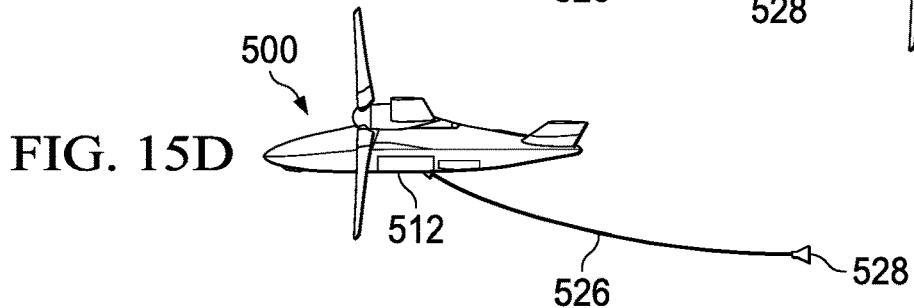
Figure 15E:
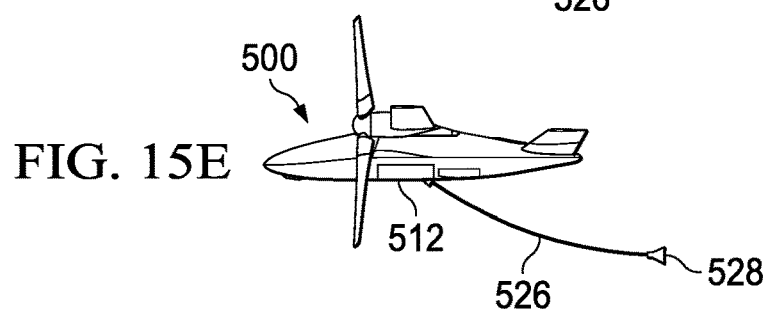
Figure 15F:
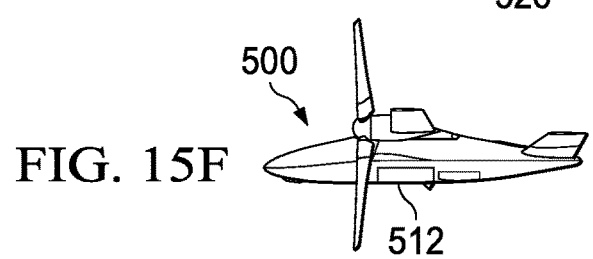
Figure 15G:
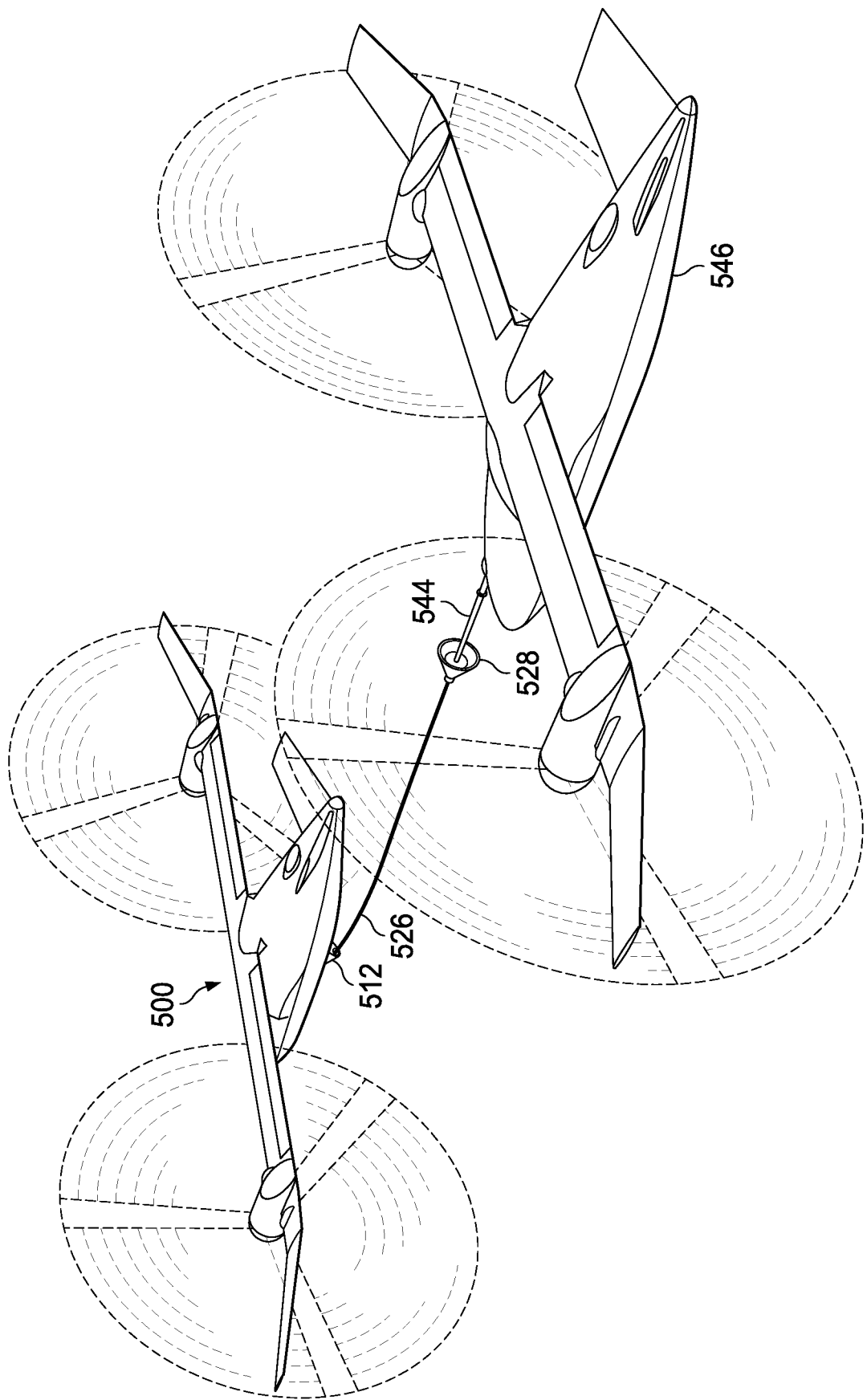

Referring to FIGS. 15A-15G in the drawings, a sequential aerial refueling scenario of rotorcraft 500 using a modular refueling system is depicted. Starting with FIG. 15A, rotorcraft 500 is in forward flight while hose 526 and drogue 528 are fully retracted into aerial refueling module 512. It will be appreciated by one of ordinary skill in the art that the aerial refueling operation may also take place while rotorcraft 500 is in VTOL flight mode. In FIG. 15B, hose 526 and drogue 528 are in the process of extending from rotorcraft 500. In FIG. 15C, probe 544 of recipient aircraft 546 has made a connection to drogue 528, and recipient aircraft 546 is in the process of receiving fuel from rotorcraft 500. An isometric view of this stage of the aerial refueling operation is also shown in FIG. 15G. While recipient aircraft 546 is illustrated as a tiltrotor aircraft, recipient aircraft 546 may be any aircraft that uses fuel, such as an airplane, helicopter or drone. In FIG. 15D, recipient aircraft 546 has been refueled and is disconnected from drogue 528. In FIGS. 15E and 15F, hose 526 and drogue 528 are retracted back into aerial refueling module 512 to complete the aerial refueling operation.

Figure 16:
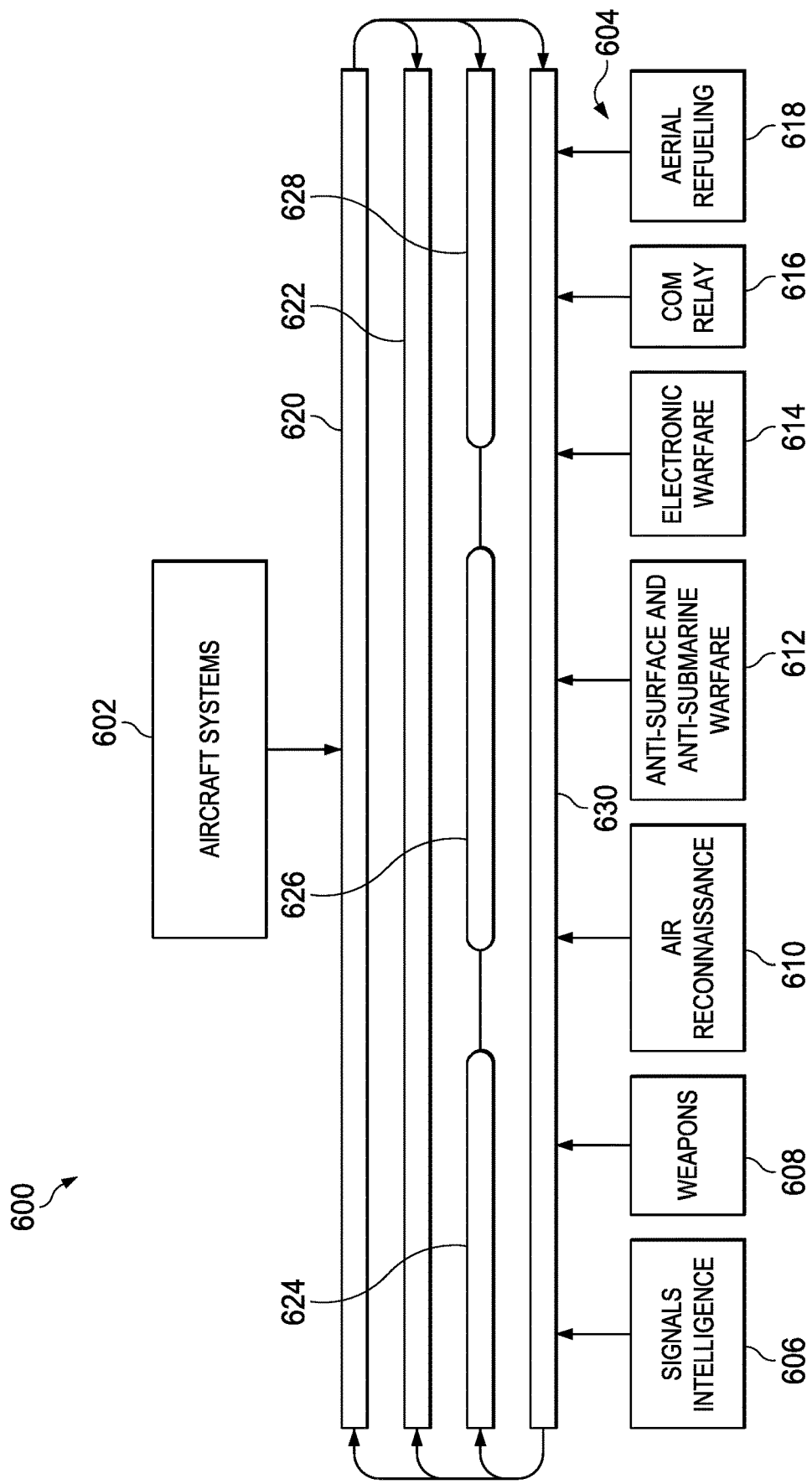
FIG. 16 is a diagram illustrating a system architecture of an aircraft with a modular payload system in accordance with embodiments of the present disclosure.

Referring to FIG. 16, the system architecture for an aircraft is schematically illustrated and generally designated 600. System architecture 600 includes aircraft systems 602, including, but not limited to, a COM suite, NAV guidance, payload management, a self-protection suite, autonomous flight controls, tactical data links, mission management, an electro-optical targeting system, aircraft subsystems and/or any combination thereof. System architecture 600 also includes modular payload system 604, including several categories of payload modules that are interchangeably insertable into the aircraft. Modular payload system 604 may include signals intelligence modules 606, such as a Twister module. Modular payload system 604 may also include weapons modules 608, such as AGM 114 HF/JAGM, GBU-39 SDB, GBU-12 PAVEWAY, GBU-38 JDAM, APKWS, directed energy or common launch tube modules. Modular payload system 604 may also include air reconnaissance modules 610, such as an AN/ZPY-1 module. Modular payload system 604 may also include anti-surface and/or anti-submarine warfare modules 612, such as AN/AES-1, AN/AQS-22 ALFS, AGM-119, MK 46, MK 50, MK 54 or sonobuoy modules. Modular payload system 604 may also include electronic warfare or attack modules 614, such as NGAEA JAMMER, HARM, AMRAAM, ALQ-231 INTREPID TIGER or AIM-9X modules. Modular payload system 604 may also include COM relay modules 616, which may include communications modules. Modular payload system 604 may also include aerial refueling modules 618, such as those described herein. Any combination of payload module categories 606, 608, 610, 612, 614, 616, 618 may be used on an aircraft. In addition, non-illustrated payload module categories may be included on the aircraft, such as cargo hooks, automatic landing systems, fuel and persistent MSN modules.

System architecture 600 also includes a number of buses to facilitate communication between payload modules 606, 608, 610, 612, 614, 616, 618 and aircraft systems 602. In particular, system architecture 600 includes a flight bus 620, a mission bus 622, a weapons bus 624, a power bus 626, a survivability bus 628 and a modular mission payload bus 630. Buses 620, 622, 624, 626, 628, 630 enable communication between aircraft systems 602 and payload modules 606, 608, 610, 612, 614, 616, 618, and utilize the modular bay interfaces and payload interfaces described above. Non-military or commercial payload modules are also encompassed by the illustrative embodiments. For example, an aircraft using the modular payload system may be able to utilize a wireless Internet module or a package delivery module with multiple doors that may be actuated independently to deliver a particular package therein.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Unless otherwise indicated, as used herein, "or" does not require mutual exclusivity. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A modular refueling system for an aircraft having a fuselage, the system comprising:
    a first modular bay recessed within the underside of the fuselage, the first modular bay including a first modular bay interface;
    a second modular bay recessed within the underside of the fuselage, the second modular bay including a second modular bay interface;
    a first plurality of payload modules each having a respective function and a first payload interface adapted to connect to at least a portion of the first modular bay interface; and
    a second plurality of payload modules each having a respective function and a second payload interface adapted to connect to at least a portion of the second modular bay interface;
    wherein, the first modular bay is a central modular bay disposed along a longitudinal centerline of the aircraft and flanked by the second modular bay;
    wherein, the first plurality of payload modules are interchangeably insertable into the first modular bay to enable the first modular bay to support the functions of the first plurality of payload modules;
    wherein, the second plurality of payload modules are interchangeably insertable into the second modular bay to enable the second modular bay to support the functions of the second plurality of payload modules; and
    wherein, at least one of the payload modules inserted in the first or second modular bay is an aerial refueling module configured to enable the aircraft to provide fuel to recipient aircraft during flight.

2. The modular refueling system as recited in claim 1 wherein the aerial refueling module further comprises a hose and a drogue, the hose and the drogue extendable from the aircraft to enable a connection to the recipient aircraft.

3. The modular refueling system as recited in claim 2 wherein the aerial refueling module further comprises a reel, the hose adapted to wind around the reel such that the hose extends from the aircraft in response to the reel rotating a first direction and retracts toward the aircraft in response to the reel rotating a second, opposite direction.

4. The modular refueling system as recited in claim 3 wherein the aerial refueling module further comprises a reel motor adapted to rotate the reel.

5. The modular refueling system as recited in claim 2 wherein the aerial refueling module further comprises a drogue receiver adapted to receive the drogue when the hose is retracted.

6. The modular refueling system as recited in claim 5 wherein the drogue receiver protrudes from an exterior surface of the aerial refueling module.

7. The modular refueling system as recited in claim 1 wherein the aerial refueling module further comprises a fuel pump operable to pump fuel from the aircraft to the recipient aircraft.

8. The modular refueling system as recited in claim 1 wherein the aerial refueling module has an exterior surface; and
    wherein at least a portion of the exterior surface of the aerial refueling module is substantially flush with the underside of the fuselage when the aerial refueling module is inserted into the first or second modular bay, thereby reducing drag of the aircraft.

9. The modular refueling system as recited in claim 1 wherein the aerial refueling module further comprises a central payload module adapted to be inserted into the first modular bay.

10. The modular refueling system as recited in claim 1 wherein the aerial refueling module further comprises a side payload module adapted to be inserted into the second modular bay.

11. The modular refueling system as recited in claim 1 wherein the payload interface of the aerial refueling module connects to at least a portion of the first or second modular bay interface in response to the aerial refueling module being inserted into the first or second modular bay.

12. An aircraft comprising:
    a fuselage having an underside;
    a first modular bay recessed within the underside of the fuselage, the first modular bay including a first modular bay interface;
    a second modular bay recessed within the underside of the fuselage, the second modular bay including a second modular bay interface;
    a first plurality of payload modules each having a respective function and a first payload interface adapted to connect to at least a portion of the first modular bay interface; and
    a second plurality of payload modules each having a respective function and a second payload interface adapted to connect to at least a portion of the second modular bay interface;
    wherein, the first modular bay is a central modular bay disposed along a longitudinal centerline of the aircraft and flanked by the second modular bay;
    wherein, the first plurality of payload modules are interchangeably insertable into the first modular bay to enable the first modular bay to support the functions of the first plurality of payload modules;

wherein, the second plurality of payload modules are interchangeably insertable into the second modular bay to enable the second modular bay to support the functions of the second plurality of payload modules; and wherein, at least one of the payload modules inserted in the first or second modular bay is an aerial refueling module configured to enable the aircraft to provide fuel to recipient aircraft during flight.

13. The aircraft as recited in claim 12 wherein the aircraft further comprises an unmanned aerial system.

14. The aircraft as recited in claim 12 wherein the aircraft further comprises a tiltrotor aircraft.

15. The aircraft as recited in claim 12 further comprising: a fuel cell, the aerial refueling module adapted to provide fuel from the fuel cell to the recipient aircraft during flight.

16. The aircraft as recited in claim 15 wherein the payload interface of the aerial refueling module is adapted to connect to at least a portion of the first or second modular bay interface to establish fluid communication between the fuel cell and the aerial refueling module.

17. The aircraft as recited in claim 15 wherein at least one of the first or second modular bay interfaces further comprises a fuel line connector, the payload interface of the aerial refueling module adapted to connect to the fuel line connector to establish fluid communication between the fuel cell and the aerial refueling module.

18. The aircraft as recited in claim 15 further comprising:
a power source adapted to provide electrical energy;
wherein at least one of the first or second modular bay interfaces further comprises a power connector, the payload interface of the aerial refueling module adapted to connect to the power connector to establish electrical communication between the power source and the aerial refueling module.

19. The aircraft as recited in claim 15 wherein the fuel cell further comprises a fuselage fuel cell.

20. The aircraft as recited in claim 15 wherein the fuel cell further comprises a plurality of fuel cells including a fuselage fuel cell and a wing fuel cell, the aerial refueling module adapted to provide fuel from at least one of the plurality of fuel cells to the recipient aircraft during flight.

* * * * *